(12) United States Patent
Nakaura et al.

(10) Patent No.: US 8,287,036 B2
(45) Date of Patent: Oct. 16, 2012

(54) FRONT BODY STRUCTURE OF VEHICLE

(75) Inventors: Masaki Nakaura, Hiroshima (JP); Tadashi Ioka, Hiroshima (JP); Masatoshi Takayama, Hiroshima (JP)

(73) Assignee: Mazda Motor Corporation (JP)

(*) Notice: Subject to any disclaimer, the term of this patent is extended or adjusted under 35 U.S.C. 154(b) by 74 days.

(21) Appl. No.: 12/871,379

(22) Filed: Aug. 30, 2010

(65) Prior Publication Data

US 2011/0062750 A1 Mar. 17, 2011

(30) Foreign Application Priority Data

Sep. 15, 2009 (JP) ................. 2009-212677
Sep. 16, 2009 (JP) ................. 2009-214328
Sep. 16, 2009 (JP) ................. 2009-214553

(51) Int. Cl.
  *B62D 25/08* (2006.01)
  *B60R 19/24* (2006.01)

(52) U.S. Cl. ............... 296/203.02; 296/187.09; 293/133

(58) Field of Classification Search ............. 296/187.03, 296/187.04, 187.09, 203.01, 203.02, 193.09; 293/133, 155
See application file for complete search history.

(56) References Cited

FOREIGN PATENT DOCUMENTS

| | | |
|---|---|---|
| DE | 101 42 796 A1 | 4/2003 |
| DE | 10 2005 025 353 A1 | 12/2006 |
| EP | 1 433 664 A2 | 6/2004 |
| EP | 2 096 002 A1 | 9/2009 |
| JP | 2001-39242 | * 2/2001 |
| JP | 2001-088634 A | 4/2001 |
| JP | 2002-52993 | * 2/2002 |
| JP | 2002-145113 | * 5/2002 |
| JP | 2001-171448 | * 6/2006 |
| JP | 2009-179198 | * 8/2009 |

OTHER PUBLICATIONS

The Extended European Search Report dated Apr. 11, 2011; EP Application No. / Patent No. 10009002.6-1523 / 2295296.
The Partial European Search Report dated Dec. 22, 2010; Application No. 10009002.6-1523.

* cited by examiner

*Primary Examiner* — Dennis Pedder
(74) *Attorney, Agent, or Firm* — Studebaker & Brackett PC; Donald R. Studebaker

(57) ABSTRACT

A front body structure of a vehicle comprises a pair of front side frames, a bumper reinforcement, a bumper face, a leg-part sweeping-away member which is provided below the bumper reinforcement and extends in a vehicle width direction, a front end of which is positioned in front of the bumper reinforcement, and a support member which supports the leg-part sweeping-away member at the front side frame. The support member has a specified length in the vehicle longitudinal direction, and comprises beads which absorb an impact load inputted in the vehicle longitudinal direction through their deformation in the longitudinal direction.

3 Claims, 33 Drawing Sheets

FRONT BODY STRUCTURE OF VEHICLE

BACKGROUND OF THE INVENTION

The present invention relates to a front body structure of a vehicle, and in particular, relates to a front body structure of a vehicle equipped with a laterally-extending member which is provided in front of and below a bumper reinforcement and supported at a front side frame.

Conventionally, in order to prevent a secondary injury of a pedestrian, such as for preventing a pedestrian from being caught under the vehicle, at a collision of the vehicle with the pedestrian, a control of sweeping away the pedestrian's leg part so that the pedestrian can be surely put on an engine hood of the vehicle has been developed. Thus, a front body structure of a vehicle equipped with a laterally-extending member which is provided below a bumper reinforcement and supported at a shroud lower member so as to extend in a vehicle width direction, i.e., a so-called leg-part sweeping-away member, is known.

The leg-part sweeping-away member requires its crushable longitudinal length which is long enough to absorb the collision energy through its crushing in the vehicle longitudinal direction when the vehicle hits against the pedestrian. However, in case a radiator slants so that an upper side thereof is positioned forwardly in the vehicle longitudinal direction for a low engine-hood layout of the vehicle, the shroud lower member is disposed at a rear portion of the vehicle, so that the leg-part sweeping-away member would be long and thereby the vehicle weight would become heavy.

Japanese Patent Laid-Open Publication No. 2001-88634 discloses a vehicle body structure which comprises a pair of support members which is fixed to a pair of front side frames, and a leg-part sweeping-away member as a laterally-extending member which is supported at this support member and extends in the vehicle width direction is provided in front of and below a bumper reinforcement, wherein the leg-part sweeping-away member is deformable by the collision energy with the pedestrian. According to this vehicle body structure, the leg-part sweeping-away member can be supported at the front side frames firmly and the impact load of the collision can be absorbed by the leg-part sweeping-away member, so that the safety of the leg part of the pedestrian can be properly secured.

Meanwhile, in order to decrease the impact load against a passenger at the vehicle frontal collision, a deformation mode control to absorb collision energy with the front side frames which are deformed by the collision energy inputted to the front side frames has been materialized. For example, a crush can arranged at a front end of the front side frame is crushed in an initial stage of collision, and the front side frame is bent outwardly in the vehicle width direction, in a plan view, having a bending center at its connection portion to a dash panel in a middle stage of collision or later. Thus, the vehicle deceleration is controlled so that it can become properly large in the initial stage of collision, and then its vehicle deceleration can be maintained.

In the above-described vehicle body structure, the leg-part sweeping-away member is firmly fixed to the front side frame with the support member, such as a high-rigidity bracket or a tie-down hook. However, the support member increases the plate thickness of the front side frame and thereby strengthens the rigidity of the frame, so that there is a concern that the crush deformation of the front side frame may be so hindered that any desired effect of the collision-energy absorption due to the deformation mode control may not be obtained. Additionally, the support member with the high rigidity may cause the heavy vehicle weight.

Further, since the above-described leg-part sweeping-away member is formed to be deformable by the collision energy, it may be required that the longitudinal length of the leg-part sweeping-away member may be long enough to have this member deformed by the collision load, so that there is a concern that the leg-part sweeping-away member itself may become improperly large sized. In case the leg-part sweeping-away member itself becomes improperly large sized, there is a concern that the layout of an attachment position of the support member to the front side frame or the like may be so limited because the leg-part sweeping-away member is necessary to be fixed to the front side frame, and additionally the vehicle weight may increase.

SUMMARY OF THE INVENTION

An object of the present invention is to provide a front body structure of a vehicle which can obtain the crush deformation of the front side frame as well as secure the support rigidity of the laterally-extending member.

According to the present invention, there is provided a front body structure of a vehicle, comprising a pair of front side frames extending in a vehicle longitudinal direction below an engine hood, a bumper reinforcement attached to respective front end portions of the front side frames and extending in a vehicle width direction, a bumper face forming an outer surface of a front end portion of the vehicle, a laterally-extending member provided below the bumper reinforcement and extending in the vehicle width direction, a front end of which is positioned in front of the bumper reinforcement, and a support member supporting the laterally-extending member at the front side frame, the support member having a specified length in the vehicle longitudinal direction, the support member comprising an impact absorption portion which absorbs an impact load inputted in the vehicle longitudinal direction at least through deformation thereof in the longitudinal direction.

According to the present invention, since the impact load inputted in the vehicle longitudinal direction is absorbed by the support member, the longitudinal length of the laterally-extending member can be shortened, preventing a pedestrian from being caught under the vehicle at a collision of the vehicle against the pedestrian, so that the vehicle weight can be properly light. Further, since the support member is attached to the vehicle body via the front side frame, the support rigidity of the support member can be secured. Thereby, any influence on the laterally-extending member which may be cased by vibrations during vehicle traveling or the inputted load at the collision with the pedestrian can be decreased, so that the prevention of the pedestrian from being caught under the vehicle can be achieved securely.

According to an embodiment of the present invention, the support member comprises an attachment portion to attach the support member to the front side frame, a support body portion comprising the impact absorption portion, and an impact transmission portion to transmit the impact load to the support body portion and support the laterally-extending member at the front side frame, and the impact transmission portion of the support member extends forwardly from a lower end portion of the support body portion. Thereby, since the impact absorption portion is provided at the support body portion, the longitudinal length of the laterally-extending member can be properly short, thereby providing the lightweight vehicle.

According to another embodiment of the present invention, the front side frame has a crush can at a front end thereof, which absorbs an impact load inputted to the bumper reinforcement in the vehicle longitudinal direction through deformation thereof in the longitudinal direction, and the attachment portion of the support member is at least attached to the crush can and comprises a weak portion to allow the deformation of the crush can. Thereby, since the attachment portion of the support member which comprises the weak portion is attached to the crush can, the laterally-extending member can be supported at the front side of the vehicle, without hindering the crush deformation of the crush can by the weak portion. Thus, the longitudinal length of the laterally-extending member can be further shortened.

According to another embodiment of the present invention, the laterally-extending member has a higher rigidity than the support member so that the impact load is transmitted to the support member to promote the deformation of the support member. Thereby, since the laterally-extending member transmits the impact load at the collision to the support member and thereby the deformation of the support member is promoted, adjustment of the amount of impact absorption can be conducted only by adjusting the support member, so that setting for the desired amount of impact absorption can be facilitated. Thus, the longitudinal length of the laterally-extending member can be properly short.

According to another embodiment of the present invention, the front body structure of a vehicle further comprises a heat exchanger provided between the pair of front side frames in back of the support member, wherein the bumper face has a traveling-air induction opening which is formed at a central area thereof in the vehicle width direction to induct traveling air into the vehicle, and the support member has a traveling-air guide portion to guide the traveling air inducted through the traveling-air induction opening to the heat exchanger. Thereby, since the traveling-air guide portion is provided at the support member, the cooling performance of the heat exchanger can be improved without increasing the parts number.

According to another embodiment of the present invention, the support member is attached to the front side frame so that the traveling air which is inducted through the traveling-air induction opening and flows below the front side frame is guided to the heat exchanger by the traveling-air guide portion thereof. Thereby, since the traveling air flowing on the outside of the heat exchanger in an elevation view and below the front side frame is guided to the heat exchanger, the cooling performance of the heat exchanger can be further improved.

According to another embodiment of the present invention, the front body structure of a vehicle further comprises another heat exchanger supported at the laterally-extending member, wherein the support member has an exhaust port which exhausts the traveling air therethrough outwardly in the vehicle width direction from the front side frame, and a guide flow passage to guide the traveling air passing through this heat exchanger to the exhaust port is formed. Thereby, since the traveling air passing through the heat exchange and this heat exchanger is exhausted to the outside of the front side frame, the heat-exchanging efficiency of the both of heat exchangers can be improved.

According to another embodiment of the present invention, the front side frame has a crush can at a front end thereof, which absorbs an impact load inputted to the bumper reinforcement in the vehicle longitudinal direction through deformation thereof in the longitudinal direction, and the support member is provided so as to extend below the crush can. Thereby, since the weight increase of the support member is restrained due to shortening of the longitudinal length of the support member, the increase of the vehicle's weight can be restrained properly, securing the above-described prevention function of the pedestrian from being caught under the vehicle (i.e., the leg-part sweeping-away function). Further, since the collision energy is absorbed by the crush can at the vehicle frontal collision, both the deformation mode control by the front side frame and the prevention function of the pedestrian from being caught under the vehicle can be performed properly.

According to another embodiment of the present invention, the support member comprises an impact absorption portion which absorbs an impact load inputted to the laterally-extending member in the vehicle longitudinal direction and a weak portion to allow the deformation of the crush can in the vehicle longitudinal direction. Thereby, since the impact load inputted in the vehicle longitudinal direction is absorbed by the support member, the longitudinal length of the laterally-extending member can be shorter. Further, since the weak portion is provided, the collision-energy absorption can be achieved securely at the vehicle frontal collision without hindering the crush deformation of the crush can.

According to another embodiment of the present invention, the support member comprises plural attachment portions to attach the support member to the crush can, the plural attachment portions being arranged away from each other in the vehicle width direction. Thereby, it can be properly prevented that the attachment portions of the support member to the crush can hinder the crush deformation of the crush can.

According to another embodiment of the present invention, the support member is formed integrally with an extension portion of the crush can. Thereby, since any particular attachment portion may be unnecessary for the support member, it can be prevented to hinder the crush deformation of the crush can and the weight reduction of the vehicle can be achieved.

According to another embodiment of the present invention, the impact absorption portion of the support member comprises a slant portion which slants by a specified angle relative to the vehicle longitudinal direction, and an upper end portion of the impact absorption portion is connected to the weak portion of the support member. Thereby, it can be prevented that the rigidity of the support member in the vehicle width direction decreases, so that the support member can be prevented from falling down inwardly in a border area of the support member and the crush can.

According to another embodiment of the present invention, the front body structure of a vehicle further comprises a heat exchanger provided between the pair of front side frames in back of the laterally-extending member, and a shroud supporting the heat exchanger, wherein the heat exchanger slants so that an upper side thereof is positioned forwardly in the vehicle longitudinal direction. Thereby, particularly, in a vehicle, such as a low-engine-hood vehicle, in which a shroud lower is arranged at a vehicle's rear portion, the weight increase of the vehicle can be restrained securing the leg-part sweeping-away function, and the deformation mode control by the front side frame can be performed.

According to another embodiment of the present invention, the bumper face is formed in a curve shape in a plan view so that a central portion thereof is positioned foremost and both-side portions thereof extend rearwardly, and the laterally-extending member is formed so that both-side end portions thereof are positioned above a central portion thereof. Thereby, even in case the laterally-extending member is located at a low height position, the amount of outward projection of the laterally-extending member in an elevation view of the vehicle can be decreased. Thus, the bumper face can be formed in the curve shape so that lower portions of both-side ends of the bumper face are positioned rearwardly from it central portion, so that the design flexibility of the vehicle front portion can be increased. Further, since the location of the laterally-extending member can be lower, the sweeping-away function of the pedestrian's leg part can be obtained securely and thereby the pedestrian can be put on the engine hood properly.

According to another embodiment of the present invention, both-side ends of the laterally-extending member are positioned right below the pair of front side frames. Thereby, the sweeping-away function of the pedestrian's leg part can be performed in a properly wide range in the vehicle width direction between the pair of front side frames, so that the safety of the pedestrian at the collision with the vehicle can be secured.

According to another embodiment of the present invention, the laterally-extending member is formed in a curve shape in an elevation view so that a central portion thereof is positioned lowermost and the both-side portions thereof extend upwardly gradually toward both-side ends thereof. Thereby, the laterally-extending member can be properly short, so that the vehicle can be properly light. Further, since the laterally-extending member curves smoothly, when the leg part of the pedestrian contacts the laterally-extending member, the pedestrian can be properly guided onto the center of the engine hood. Accordingly, it can be effectively prevented that the pedestrian hits against the bumper reinforcement directly at the outside portion of the front portion of the vehicle.

According to another embodiment of the present invention, the laterally-extending member has a standing-up portion which extends upwardly at a transition portion thereof which is located from the central portion thereof to the both-side end portions thereof. Thereby, a space where the bumper face can curve is formed on the outside of the standing-up portion, so that a lower portion of the bumper face can be formed in a curve shape in the plan view so that its both-side portions are located rearwardly compared to its central portion. Accordingly, the design flexibility can be increased.

According to another embodiment of the present invention, the front body structure of a vehicle further comprises an undercover which is positioned below the laterally-extending member and covers a lower face of the vehicle, wherein the undercover comprises a support portion to support the laterally-extending member at a front end of a central portion thereof. Thereby, a downward moment which acts on the central portion of the laterally-extending member at the vehicle collision with the pedestrian can be supported by the undercover, so that the control of the putting the pedestrian on the engine hood can be conducted securely Other features, aspects, and advantages of the present invention will become apparent from the following description which refers to the accompanying drawings.

DETAILED DESCRIPTION OF THE INVENTION

Figure 1:
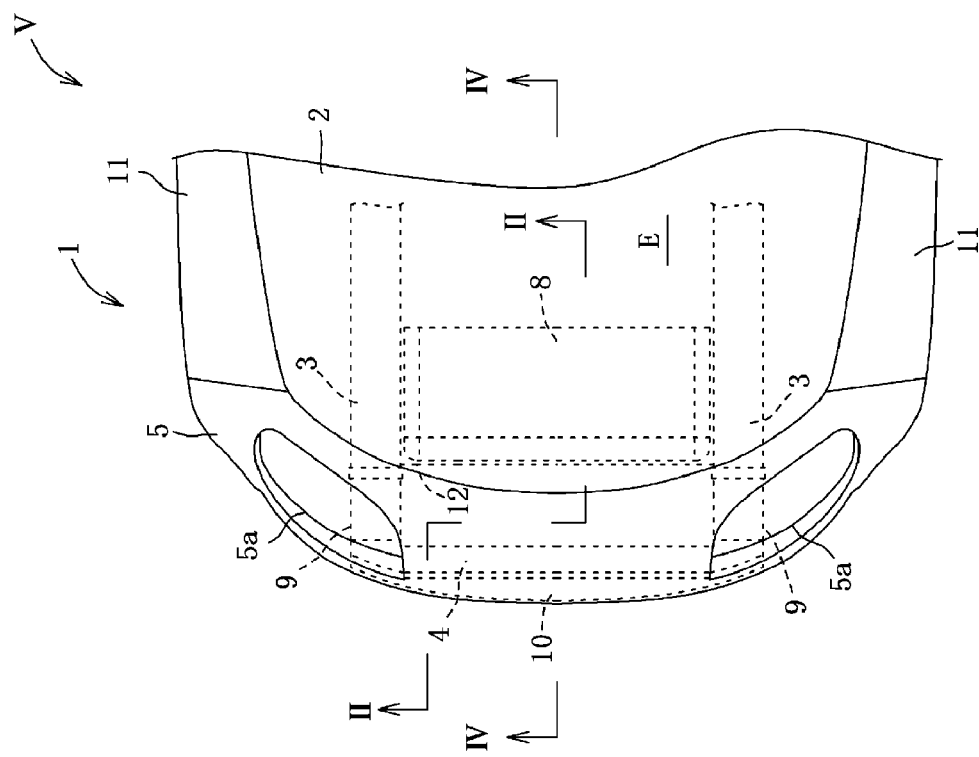
FIG. 1 is a plan view of a front body structure of a vehicle according to a first embodiment of the present invention.

Hereinafter, preferred embodiments of the present invention will be described referring to the accompanying drawings. Hereinafter, a longitudinal direction of a vehicle will be referred to as a "longitudinal direction" and a lateral direction of the vehicle will be referred to as a "lateral direction" simply.

Embodiment 1

A first embodiment will be described referring to FIGS. 1 through 8. A front body 1 of a vehicle V comprises an engine hood 2 which covers over an engine room E, a pair of front side frames 3 which extends in a vehicle longitudinal direction, a bumper reinforcement 4 which extends in a vehicle width direction, a bumper face 5 which forms an outer surface of the front body 1, a leg-part sweeping-away member 6 (i.e., a laterally-extending member) which extends in the vehicle width direction, a support member 7 which supports the member 6 at the front side frames 3, a radiator 8 (heat exchanger) which conducts a heat exchange between a coolant of an engine (not illustrated) and traveling air, and so on.

An engine-hood reinforcement 2a is arranged at a front end portion of the engine hood 2 so as to extend in the vehicle width direction along an contour of the front end portion of the engine hood 2. The engine-hood reinforcement 2a forms a closed-cross section portion with the engine hood 2.

The pair of front side frames 3 is disposed in front of a dash panel (not illustrated) which partitions a front end portion of a vehicle compartment so as to extend in the vehicle longitudinal direction at both sides of the engine room E. The front side frames 3 extend substantially horizontally from a front position to a rear position of the vehicle V, a mid-way portion of a rear end of which is joined to a vertical wall portion of the dash panel. The both-side front side frames have substantially the same structure, so only the right-side front side frame 3 will be mainly described.

Figure 2:
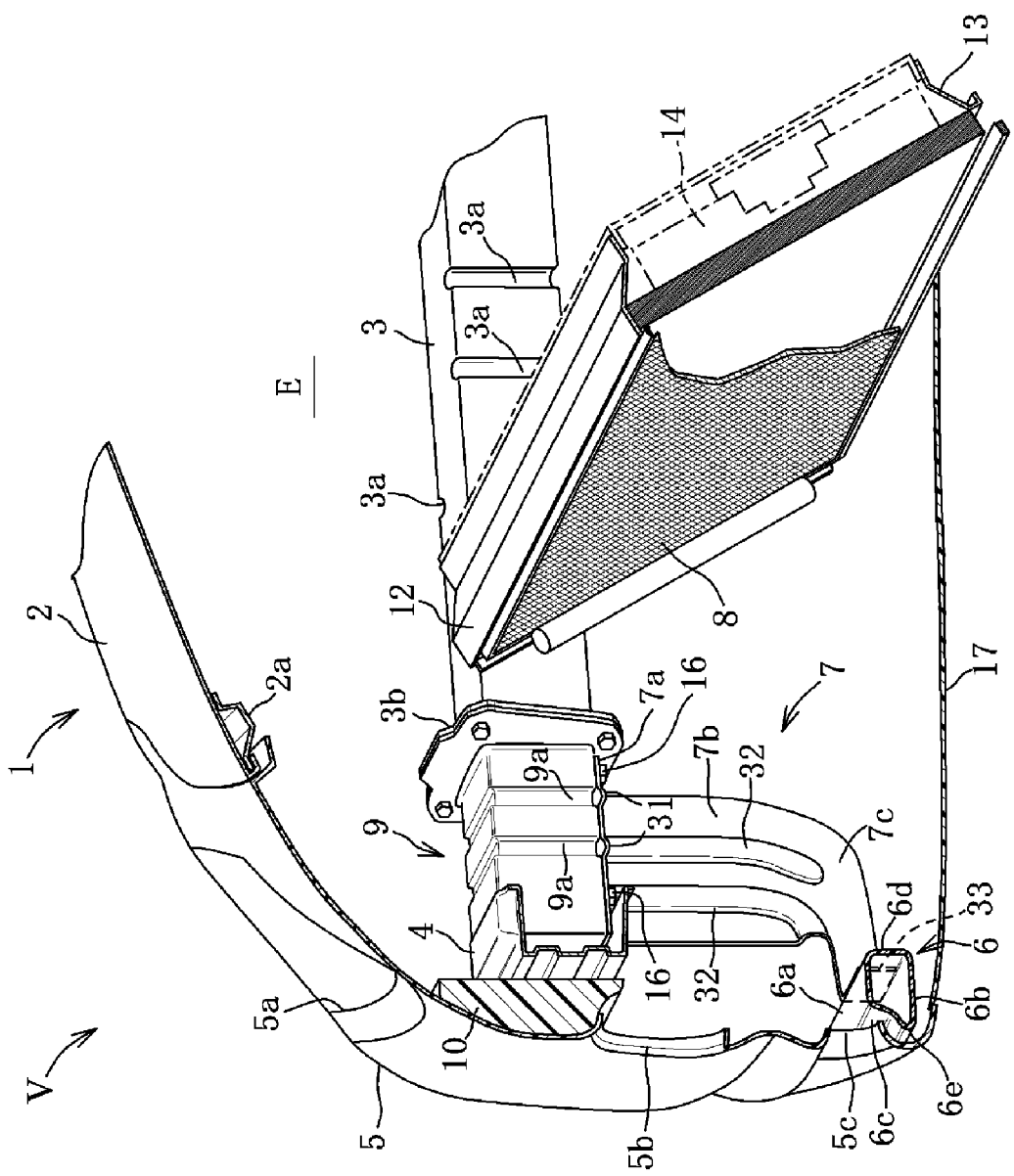
FIG. 2 is a perspective view of a major part of a right-half inside of a front body, omitting a shroud panel (a sectional view taken along line II-II of FIG. 1).
Figure 3:
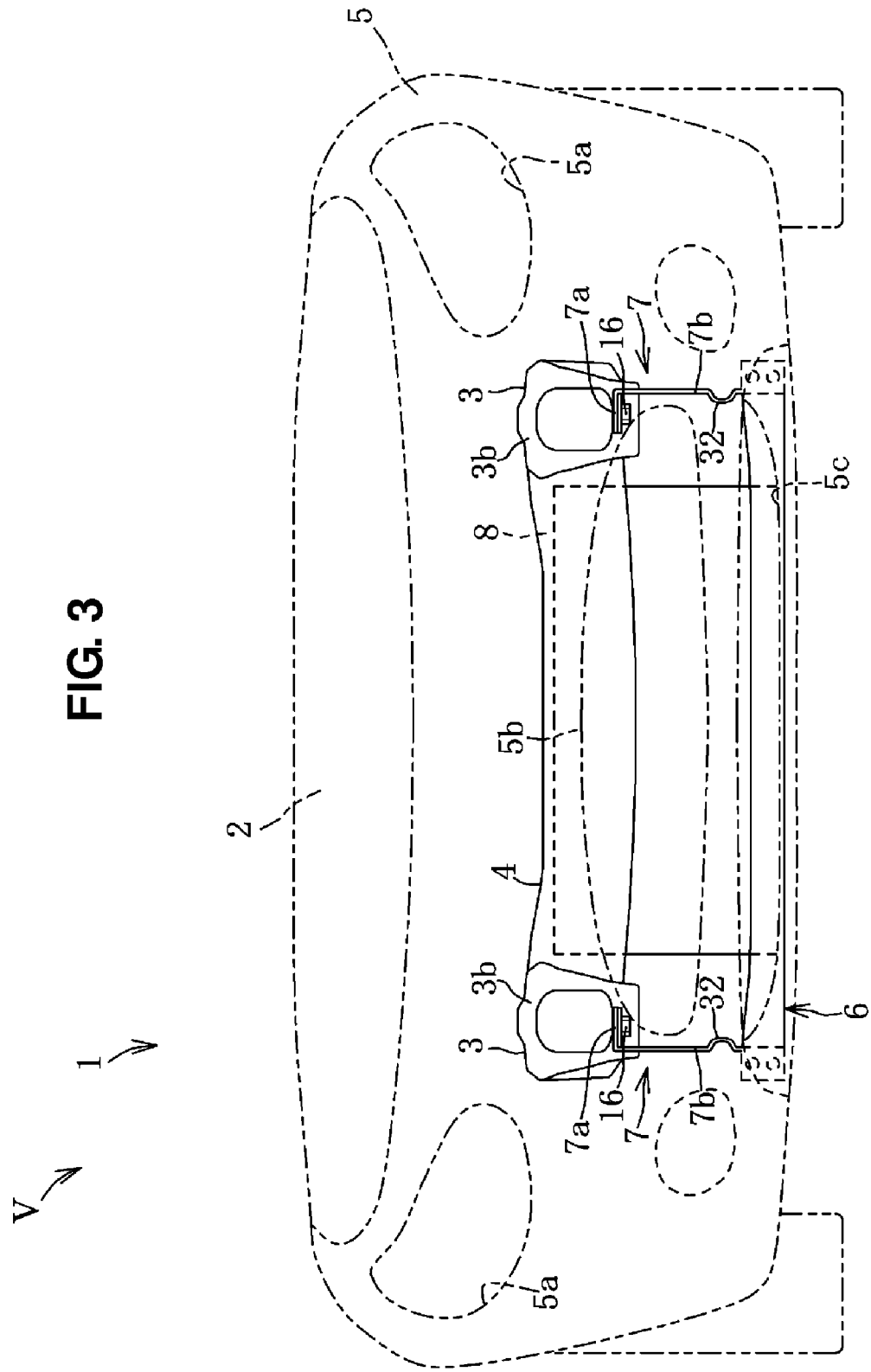
FIG. 3 is an elevation view of the vehicle body, omitting a bumper face.
Figure 4:
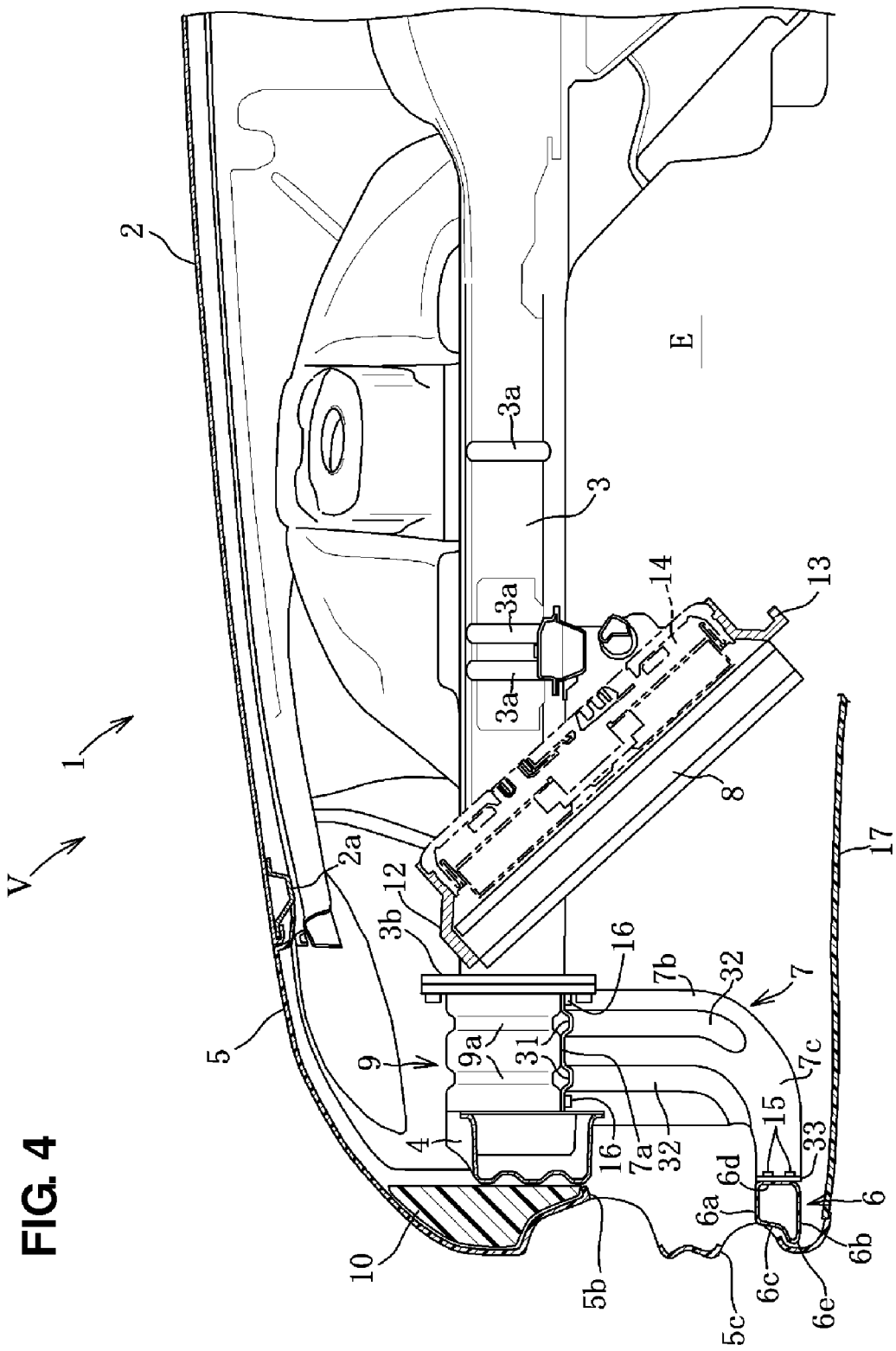
FIG. 4 is a sectional view taken along line IV-IV of FIG. 1.

As shown in FIGS. 2 and 4, the front side frame 3 is comprised of an outer panel on the outside and an inner panel on the inside, and these panels from a substantially-rectangular closed-cross section portion of the front side frame 3. Further, the front side frame 3 has plural beads 3a which are formed at its outer and inner panels, respectively, so as to extend vertically. A bead depth and a vertical length of each bead 3a are set so that the front side frame 3 can be bent in a specified direction at a vehicle frontal collision.

A flange 3b for attaching a crush can 9 via a shroud panel (not illustrated) is provided at a front end portion of the front side frame 3. The crush can 9, which is of a square cylindrical shape, has two ring grooves 9a which are formed on its surface so as to extend perpendicularly to the vehicle longitudinal direction and be concaved toward the inside, respectively. The crush can 9 is fixed to the flange 3b via bolts at its rear end.

The bumper reinforcement 4 is coupled to the front end portion of the crush can 9. The bumper reinforcement 4 has a closed cross section which extends in the vehicle width direction. The front end portion of the crush can 9 is inserted into the inside of the closed cross section of the bumper reinforcement 4. Accordingly, the bumper reinforcement 4 has a U-shaped cross section at its specified portion for accepting the crush can 9. Thus, when an impact load is inputted to the crush can 9 via the bumper reinforcement 4 in an initial stage of vehicle collision, the crush can 9 is crushed (deformed) at the grooves 9a and thereby absorbs a collision energy.

An impact absorbing member 10, which is made from foaming synthetic resin, is arranged in front of the bumper reinforcement 4 over a whole area of the width of the bumper face 5. The impact absorbing member 10 absorbs the collision energy through its compressive deformation which is caused by the collision load inputted thereto via the bumper face 5 at the vehicle collision, and this member 10 has a proper size and shape for providing a desired energy absorption function. The impact absorbing member 10 may be made of a synthetic-resin made structure having plural ribs alternatively.

The bumper face 5 comprises openings 5a for a pair of retractable headlights, a traveling-air induction opening 5b which is formed at a central area thereof in the vehicle width direction to induct the traveling air into the vehicle room E, a traveling-air induction opening 5c which is formed at a position below the traveling-air induction opening 5b, and so on. A pair of front fenders 11 which is continuous from the bumper face 5 and forms an outer surface of a side portion of the vehicle is provided at both-side rear end portions of the bumper face 5.

Between the pair of front side frames 3, as shown in FIG. 4, are provided a shroud upper 12 which supports an upper portion of the radiator 8, a shroud lower 13 which supports a lower portion of the radiator 8, a pair of shroud sides (not illustrated) which interconnects the both-side end portions of the shroud upper 12 and both-side end portions of the shroud lower 13. These shroud upper 11, shroud lower 13 and pair of shroud sides are arranged so as to slant forwardly, and these members are of a rectangular frame shape having an opening at a central area thereof. This opening formed with these members is positioned so as to face to the above-described traveling-air induction openings 5b, 5c of the bumper face 5. Thus, the radiator 8 slants so that an upper side thereof is positioned forwardly in the vehicle longitudinal direction for a low engine-hood layout of the vehicle.

The radiator 8 and a fan 14 for the radiator 8 are disposed between the shroud upper 12 and the shroud lower 13. The shroud upper 12 has a bracket (not illustrated) to support the upper portion of the radiator 8 which is attached thereto with bolts. The shroud lower 13 has a bracket (not illustrated) to support the lower portion of the radiator 8. Thus, the radiator 8 cools the coolant (cooling water) of the engine with the traveling air inducted through the induction opening 5b and so on The synthetic-resin made leg-part sweeping-away member 6 (laterally-extending member) is provided in front of and below the bumper reinforcement 4, that is, below the impact absorbing member 10 and behind the traveling-air induction opening 5c which corresponds to the height of a pedestrian's leg part so that its front end is positioned forwardly from the bumper reinforcement 4. The leg-part sweeping-away member 6 is comprised of an upper face portion 6a, a lower face portion 6b, a front face portion 6c, a rear face portion 6d, and so on, and has a closed-cross section portion which extends in the vehicle width direction. A projection 6e which projects forwardly and extends in the vehicle width direction is formed at a lower portion of the front face portion 6c. Both-side end portions of the leg-part sweeping-away member 6 are attached to the both-side support members 7 by bolts 15. Herein, the leg-part sweeping-away member 6 may be formed in a solid structure in place of the above-described hollow structure. In FIG. 1, an illustration of the leg-part sweeping-away member 6 is omitted because it is located almost at the same position as the impact absorbing member 10.

Figure 5:
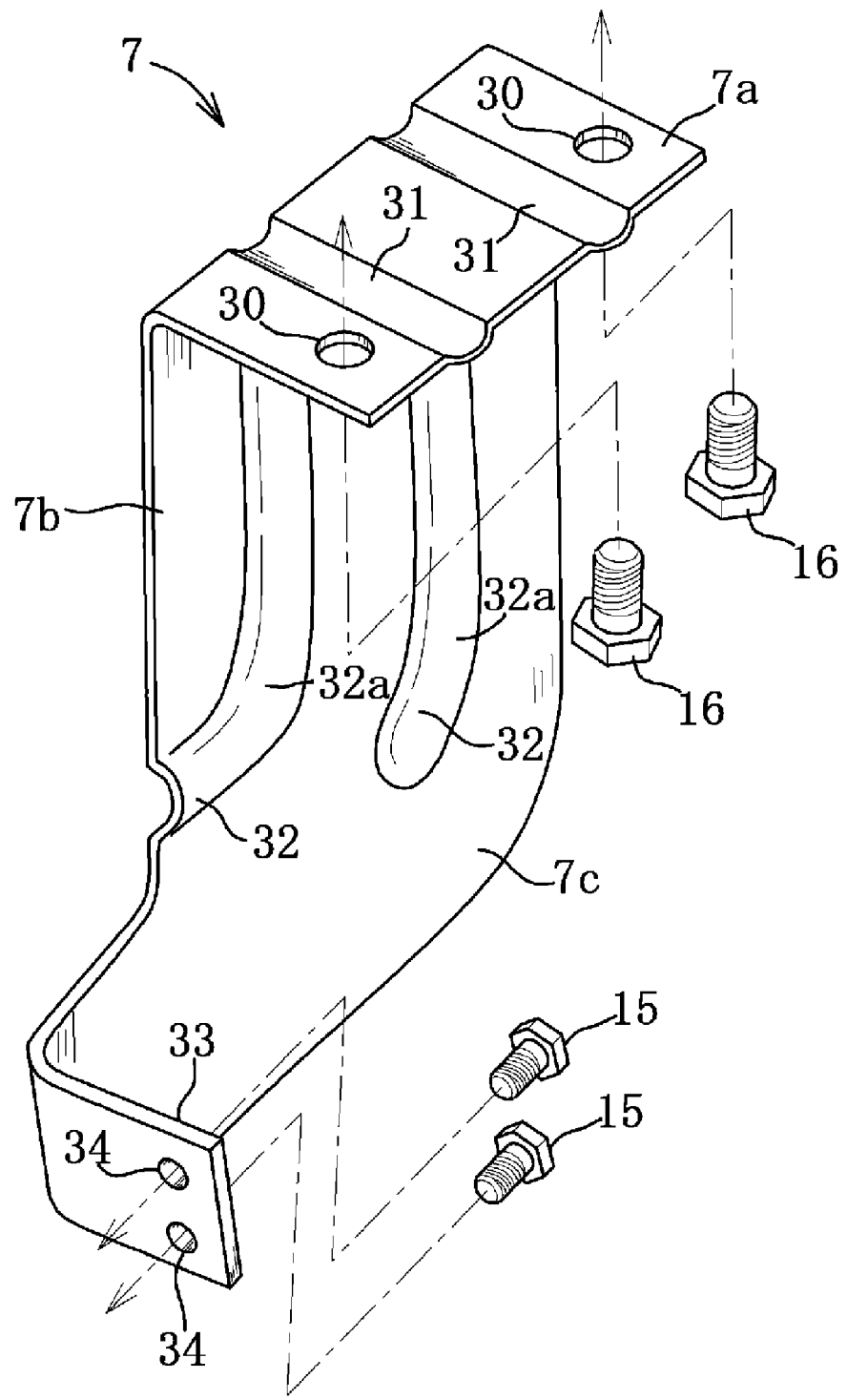
FIG. 5 is a perspective view of a support member.

As shown in FIGS. 2, 4 and 5, the steel-plate made support member 7 comprises an attachment portion 7a to attach the support member 7 to the crush can 9, a support body portion 7b, an impact transmission portion 7c which transmits the impact load to the support body portion 7b and attaches the leg-part sweeping-away member 6, and the like. The both-side support members 7 are fixed to respective lower end faces of the both-side crush cans 9 with bolts 16. These support members 7 have substantially the same structure, so the right-side support member 7 will be described.

The attachment portion 7a includes, as shown in FIG. 5, a pair of bolt holes 30 which are for the blots 16, two-row beads 31 (weak portions) which are formed facing to the above-described grooves 9a so as to extend perpendicularly to the vehicle longitudinal direction and be concaved toward an opposite side to the grooves 9a, respectively, and so on. When the support member 7 is fixed to a lower end face of the crush can 9, the attachment portion 7a is arranged in parallel to a face perpendicular to the vehicle vertical direction, and each bead 31 is arranged in perpendicular to the vehicle longitudinal direction.

According to the above-described structure, when the grooves 9a of the crush can 9 are crushed at the collision of the vehicle V, the attachment portion 7a fixed to the lower end face of the crush can 9 with the bolts 16 can be crushed in the vehicle longitudinal direction through the crush deformation of the beads 31. Accordingly, the attachment portion 7a can support the leg-part sweeping-away member 6 at the front side frame 3 without hindering the collision-energy absorption by the crush can 9.

The support body portion 7b is formed so as to bend from an outside end portion of the attachment portion 7a and extend downwardly, and includes two-row beads 32 (impact absorption portion) which are formed so as to be concaved toward the inside of the vehicle and extend vertically and so on. The front bead 32 extends downwardly continuously from an outside end portion of the front bead 31, and has a curve portion 32a which curves forwardly at a lower portion of the support body portion 7b and extends up to a front end portion of the support body portion 7b. The rear bead 32 extends downwardly continuously from an outside end portion of the rear bead 31, and has a curve portion 32a which curves forwardly at a lower portion of the support body portion 7b and extends to a midway position of the support body portion 7b in the vehicle longitudinal direction. Upper portions of the front bead 32 and the rear bead 32 extend vertically almost in parallel to each other, and lower portions of these are formed substantially at the same height position.

A bead depth and a vertical length of each bead 32 are set so as to absorb the impact load which is greater than the collision energy necessary to put the pedestrian on the engine hood 2 when the vehicle collides with the pedestrian. Thereby, the impact load acting on the pedestrian at the collision can be as small as possible, and the pedestrian can be put on the engine hood 2 effectively.

The impact transmission portion 7c is formed so as to curve forwardly from a lower end portion of the support body portion 7b. The impact transmission portion 7c includes an attachment portion 33 which is formed so as to bend inwardly from its front end portion for attaching the leg-part sweeping-away member 6, a pair of bolt holes 34 which is formed at the attachment portion 33, and so on. The leg-part sweeping-away member 6 which is fixed to the front surface of the attachment portion 33 is fixed to the support member 7 by the bolts 15 inserted through the bolt holes 34.

As shown in FIGS. 2 and 4, a synthetic-resin made undercover 17 is provided below a front portion of the engine room E. The undercover 17 extends from a lower end portion of the bumper face 5 to a position below the shroud lower 13 supporting the lower portion of the radiator 8. An attachment bracket (not illustrated) which is provided at the leg-part sweeping-away member 6 at its central position is connected to a front end portion of the undercover 17.

Next, the deformation mode control by the front side frame 3 at the collision of the vehicle V will be described. When the frontal collision of the vehicle happens, part of the impact load which has not be absorbed by the bumper face 5 and the impact absorbing member 10 is transmitted to the crush can 9. Then, this transmitted impact load is absorbed by the crush can 9 through the crush deformation of its grooves 9a. Herein, part of the impact load which cannot be absorbed even by the crush can 9 is inputted from the front end portion of the front side frame 3 and then transmitted rearwardly.

The impact load inputted to the front end portion of the front side frame 3 acts on the plural beads 3a, which causes a start of bending deformation of the beads 3a. Herein, since the beads 3a are formed in a concave shape, the modulus of section of this bead's part of the front side frame 3 is smaller than that of another part of that which is located in front or back of this bead's part. Thus, the beads 3a tend to bend outwardly in the vehicle width direction easily. Accordingly, the collision energy from the vehicle frontal collision is absorbed.

Herein, while the support member 7 is fixed to the crush can 9 via the attachment portion 7a, the two-row beads 31 are formed corresponding to the grooves 9a, so that the beads 31 are crushed in the vehicle longitudinal direction according to the crush deformation of the grooves 9a. Thereby, the absorption of the collision energy by the crush can 9 in the initial stage of the collision is not hindered.

Figure 6:
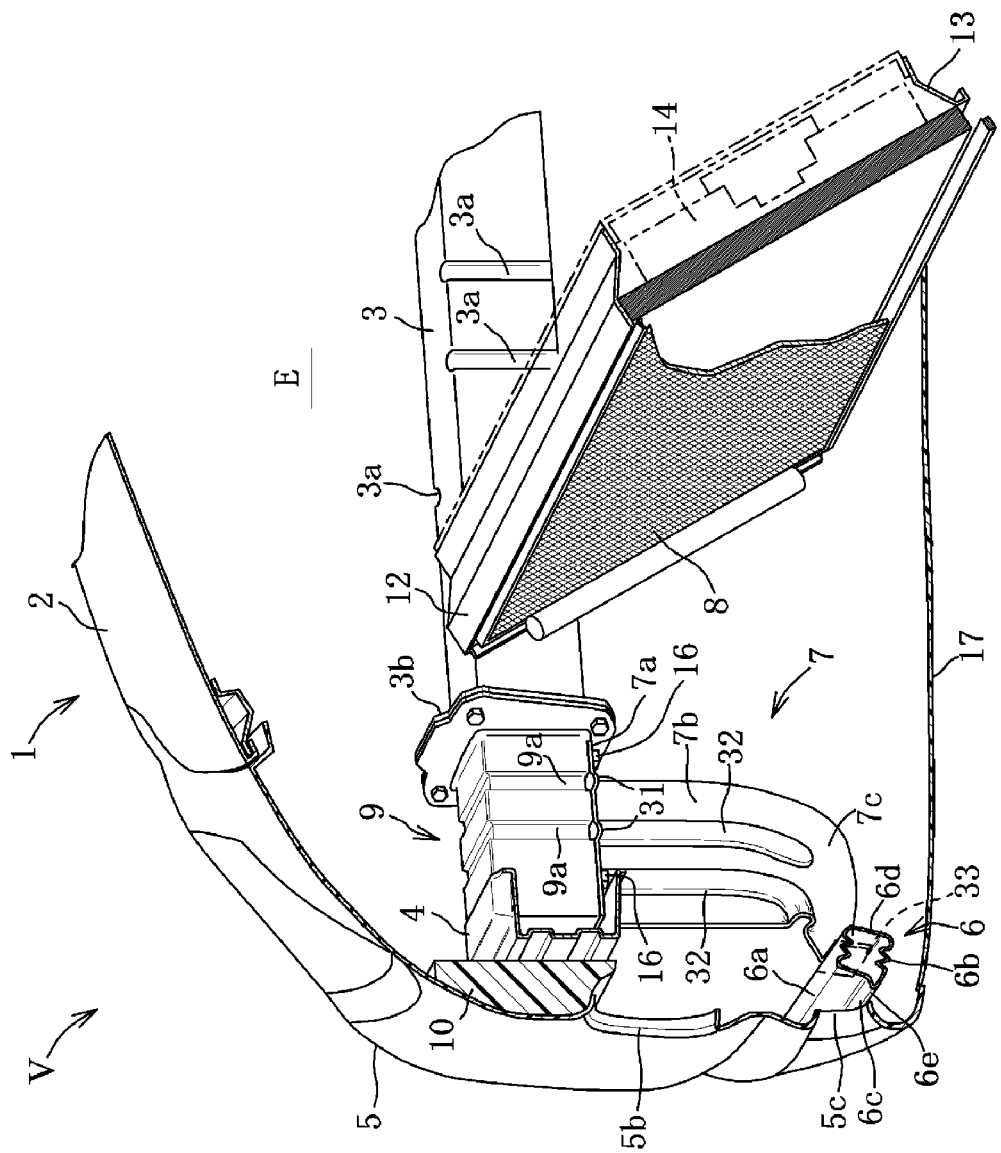
FIG. 6 is a perspective view, which corresponds to FIG. 2, showing a state after a collision.
Figure 7:
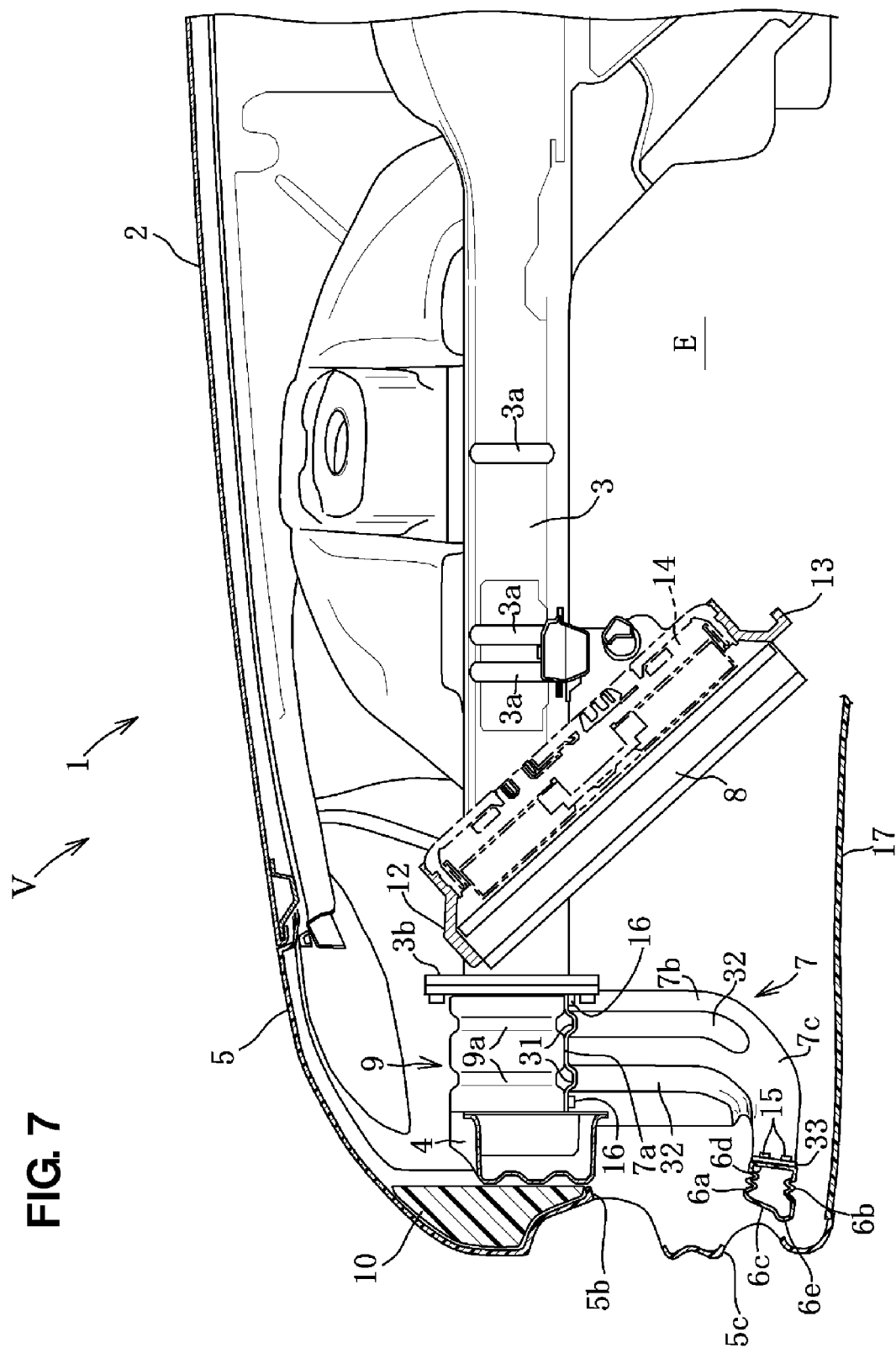
FIG. 7 is a sectional view, which corresponds to FIG. 4, showing the state after the collision.

Hereinafter, the control of sweeping away the leg part of the pedestrian by the leg-part sweeping-away member 6 will be described. As shown in FIGS. 6 and 7, when the vehicle collides with a pedestrian, since the leg-part sweeping-away member 6 is disposed below the impact absorbing member 10 and behind the traveling-air induction opening 5c which corresponds to the height of the pedestrian's leg part, the projection 6e hits against the leg part of the pedestrian via the bumper face 5. The impact load inputted to the projection 6e is absorbed through the crush deformation of the upper face portion 6a and the lower face portion 6b.

Part of the impact load which has not absorbed through the crush deformation of the above-described portions 6a, 6b is transmitted from the attachment portion 33 to the impact transmission portion 7c. Since the impact transmission portion 7c is formed in the flat-plate shape by curving forwardly from the lower end portion of the support body portion 7b, the longitudinal-direction impact load is transmitted to the support body portion 7b with little damping.

Figure 8:
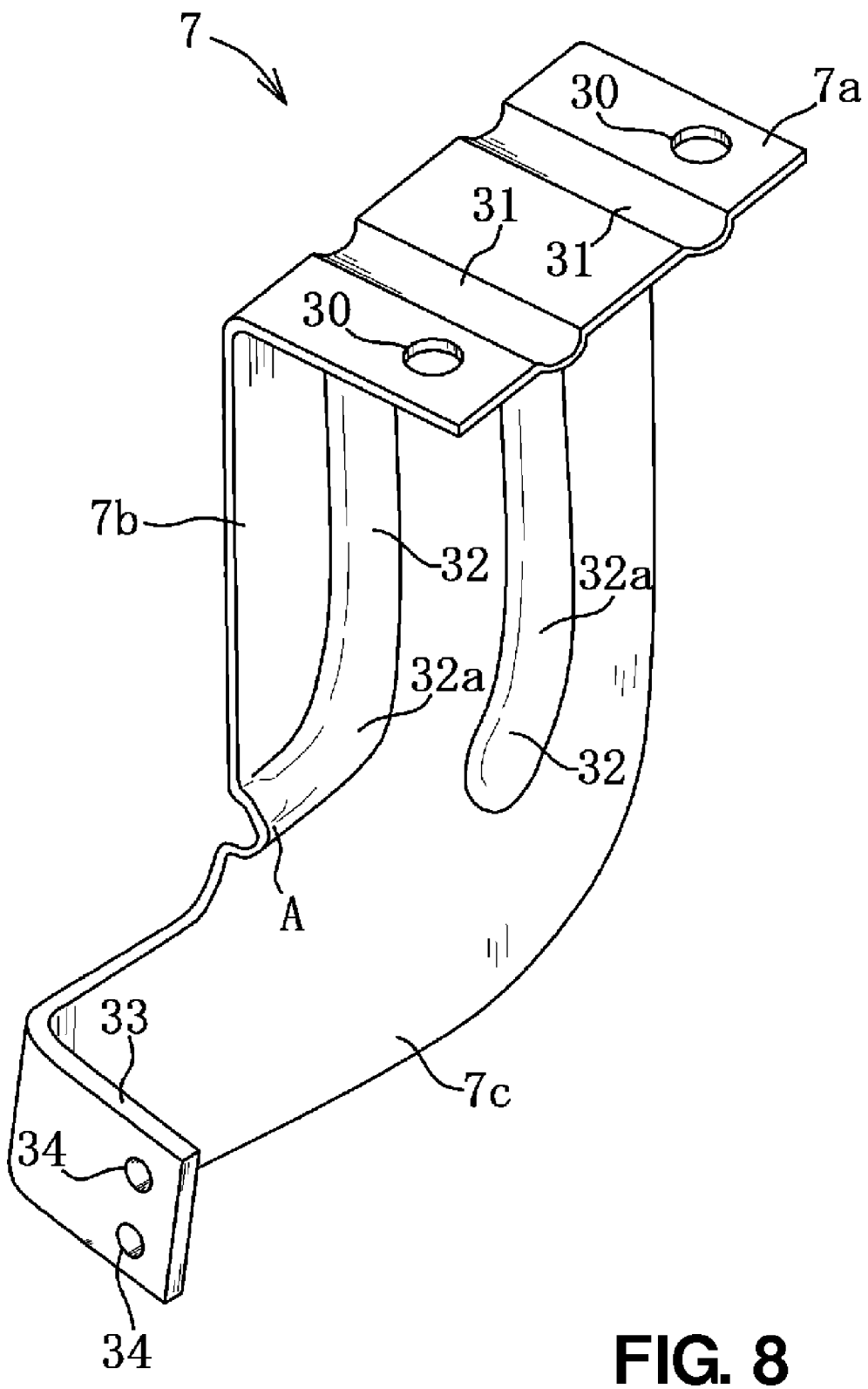
FIG. 8 is a perspective view, which corresponds to FIG. 5, showing the state after the collision.

The impact load inputted to the support body portion 7b is absorbed by the deformation of the two-row beads 32 extending vertically. In case the impact load inputted to the support body portion 7b is small, as shown in FIG. 8, the crush deformation of a front part of the front bead 32 absorbs the impact load. As the impact load becomes greater, a crush area A of the front bead 32 enlarges rearwardly and upwardly. Part of the impact load not absorbed through the crush deformation of the front bead 32 is absorbed by the crush deformation of the rear bead 32. Herein, in case the front end portion of the impact transmission portion 7c moves upwardly, the both beads 32 have their crush deformation. While in case the impact transmission portion 7c moves downwardly, the both beads 32 have their extension deformation. Thus, these deformations of the beads 32 absorb the impact load.

As described above, since the projection 6e of the leg-part sweeping-away member 6 hits against the leg part of the pedestrian first at the collision of the vehicle V with the pedestrian, the pedestrian's leg part is swept away by the leg-part sweeping-away member 6 so that the pedestrian can be put on the engine hood 2 effectively before the upper-half body of the pedestrian hits against the bumper reinforcement 4. Further, since the impact load which is greater than the collision energy which may be necessary to have the pedestrian put on the engine hood 2 is absorbed by the crush deformation of the beads 32, the impact load which may act on the pedestrian cane be lower.

Next, the operation and effect of the above-described front body structure will be described.

Since this front body structure comprises the pair of front side frames 3 extending in the vehicle longitudinal direction below the engine hood 2, the bumper reinforcement 4 attached to the respective front end portions of the front side frames 3 and extending in the vehicle width direction, the bumper face 5 forming the outer surface of the front end portion of the vehicle, the leg-part sweeping-away member 6 provided below the bumper reinforcement 4 and extending in the vehicle width direction, the front end of which is positioned in front of the bumper reinforcement 4, and the support member 7 supporting the leg-part sweeping-away member 6 at the front side frames 3, it can be prevented that the pedestrian is caught under the vehicle at the collision of the vehicle V with the pedestrian.

Since the support member 7 comprises the beads 32 which absorb the impact load inputted to the leg-part sweeping-away member 6 in the vehicle longitudinal direction, it may be unnecessary that leg-part sweeping-away member 6 have any particular impact-absorbing function and thereby the longitudinal length of the leg-part sweeping-away member 6 can be properly short, so that the vehicle weight can be properly light. Thus, since the short leg-part sweeping-away member 6 is provided, the flexibility of attachment of the support member 7 to the front side frame 3 can be increased. Further, since the light weight of the leg-part sweeping-away member 6 is achieved, the rigidity of the support member 7 can be decreased, so that the support member 7 can be attached to the front side frame 3 properly without hindering the deformation mode control of the front side frame 3 at the collision.

Since the leg-part sweeping-away member 6 comprises the upper face portion 6a, lower face portion 6b, front face portion 6c, rear face portion 6d, projection 6e and so on, and has the structure with the closed-cross section extending in the vehicle width direction, the deformation of the support member 7 can be promoted with the transmission of the impact load to the support member 7. Further, adjustment of the impact absorption can be facilitated by setting the support member 7 with the above-described promotion of the deformation of the support member 7. Accordingly, the short and small-sized leg-part sweeping-away member 6 can be provided as well as the proper absorption of the impact load longitudinally inputted to the leg-part sweeping-away member 6 by the support member 7.

Since the support member 7 comprises the attachment portion 7a to attach the support member 7 to the front side frame 3, the support body portion 7b comprising the beads 32, and the impact transmission portion 7c to transmit the impact load to the support body portion 7b and support the leg-part sweeping-away member 6, and the impact transmission portion 7c extends forwardly from the lower end portion of the support body portion 7c, the longitudinal length of the leg-part sweeping-away member 6 can be properly short, thereby providing the light-weight vehicle.

Since the pair of front side frames 3 has the crush can 9 at the front end thereof, which absorbs the impact load inputted to the bumper reinforcement 4 in the vehicle longitudinal direction through its deformation in the longitudinal direction, and the attachment portion 7a is attached to the lower end face of the crush can 9 and comprises the beads 31 to allow the deformation of the crush can 9, the leg-part sweeping-away member 6 can be supported at the front side of the vehicle, without hindering the crush deformation of the grooves 9a of the crush can 9. Consequently, the longitudinal length of the leg-part sweeping-away member 6 can be properly short.

Embodiment 2

A front body structure of a vehicle according to a second embodiment will be described referring to FIG. 9. Herein, only different structure from the first embodiment will be described, and the same components as the first embodiment are denoted by the same reference characters, descriptions of which are omitted here.

Figure 9:
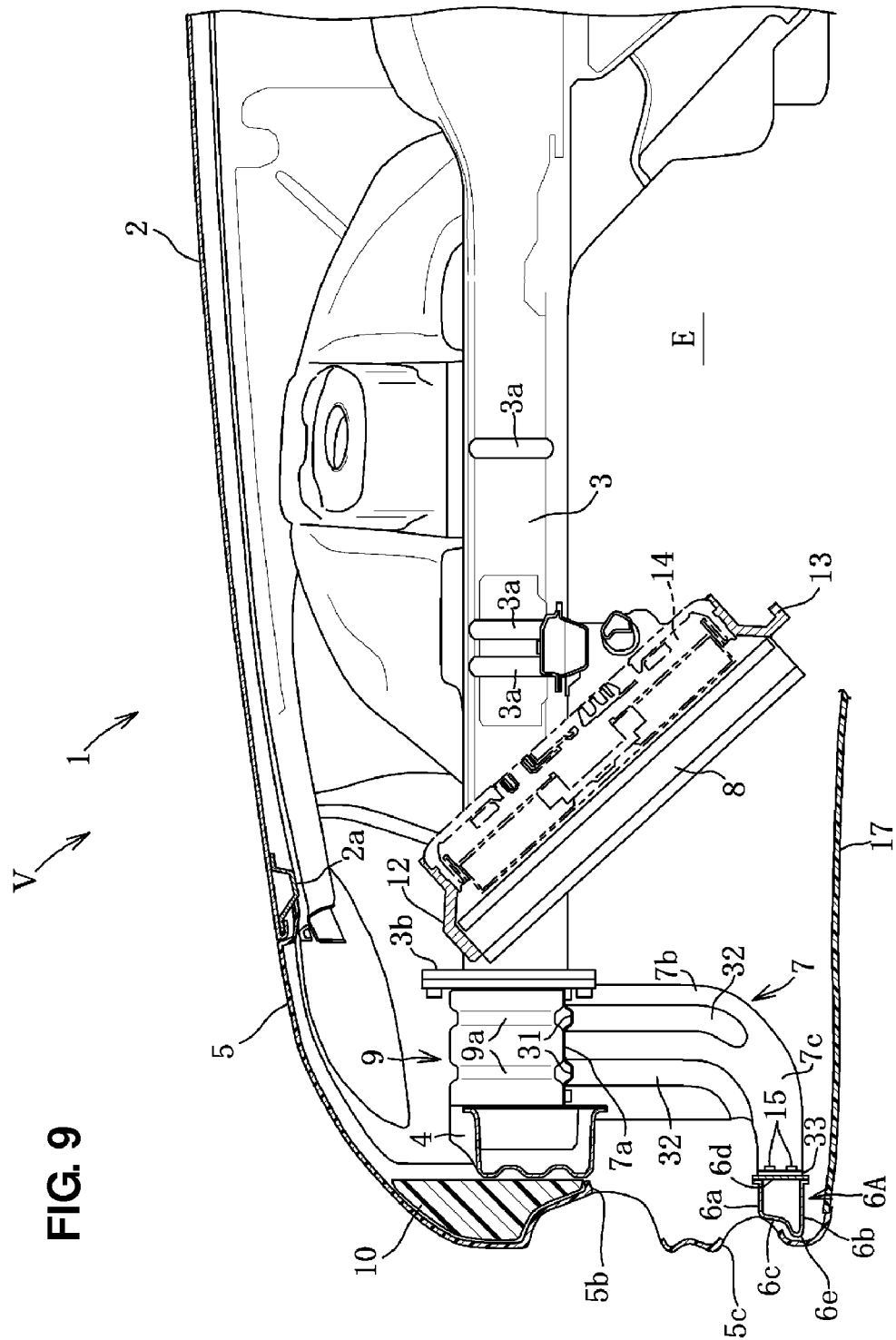
FIG. 9 is a sectional view, which corresponds to FIG. 4, according to a second embodiment.

As shown in FIG. 9, a leg-part sweeping-away member 6A, which is made of a steel plate, has the structure with the closed cross section extending in the vehicle width direction, and the longitudinal-direction rigidity of the leg-part sweeping-away member 6A is greater than that of the support member 7. The leg-part sweeping-away member 6A comprises the upper face portion 6a, lower face portion 6b, front face portion 6c, rear face portion 6d, projection 6e which projects forwardly from the lower portion of the front face portion 6c, and so on. Both-side end portions of the leg-part sweeping-away member 6A are attached to the both-side support members 7 with the bolts 15.

Next, the operation and effect of the above-described front body structure according to the second embodiment will be described.

According to this front body structure, since the leg-part sweeping-away member 6A has the greater longitudinal-direction rigidity than the support member 7, the impact energy can be absorbed only by the support member 7. Thus, the adjustment of the impact absorption can be facilitated only by setting the beads 32 and the proper rigidity with selection of material and the like of the support member 7. Further, the longitudinal length of the leg-part sweeping-away member 6A can be further shortened with the high rigidity of the leg-part sweeping-away member 6A, thereby achieving the light weight of the vehicle.

Embodiment 3

Figure 10:
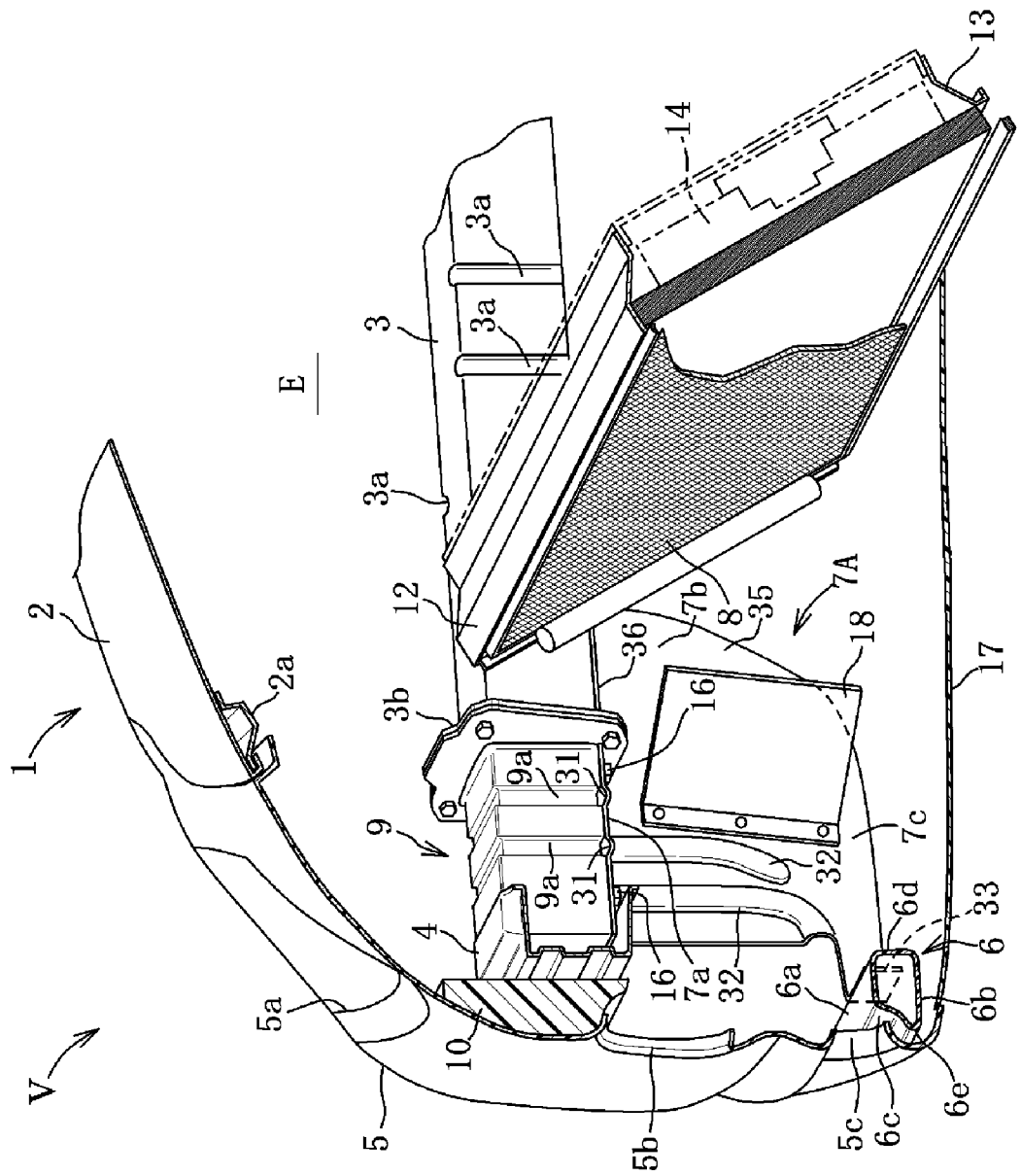
FIG. 10 is a sectional view, which corresponds to FIG. 2, according to a third embodiment.
Figure 11:
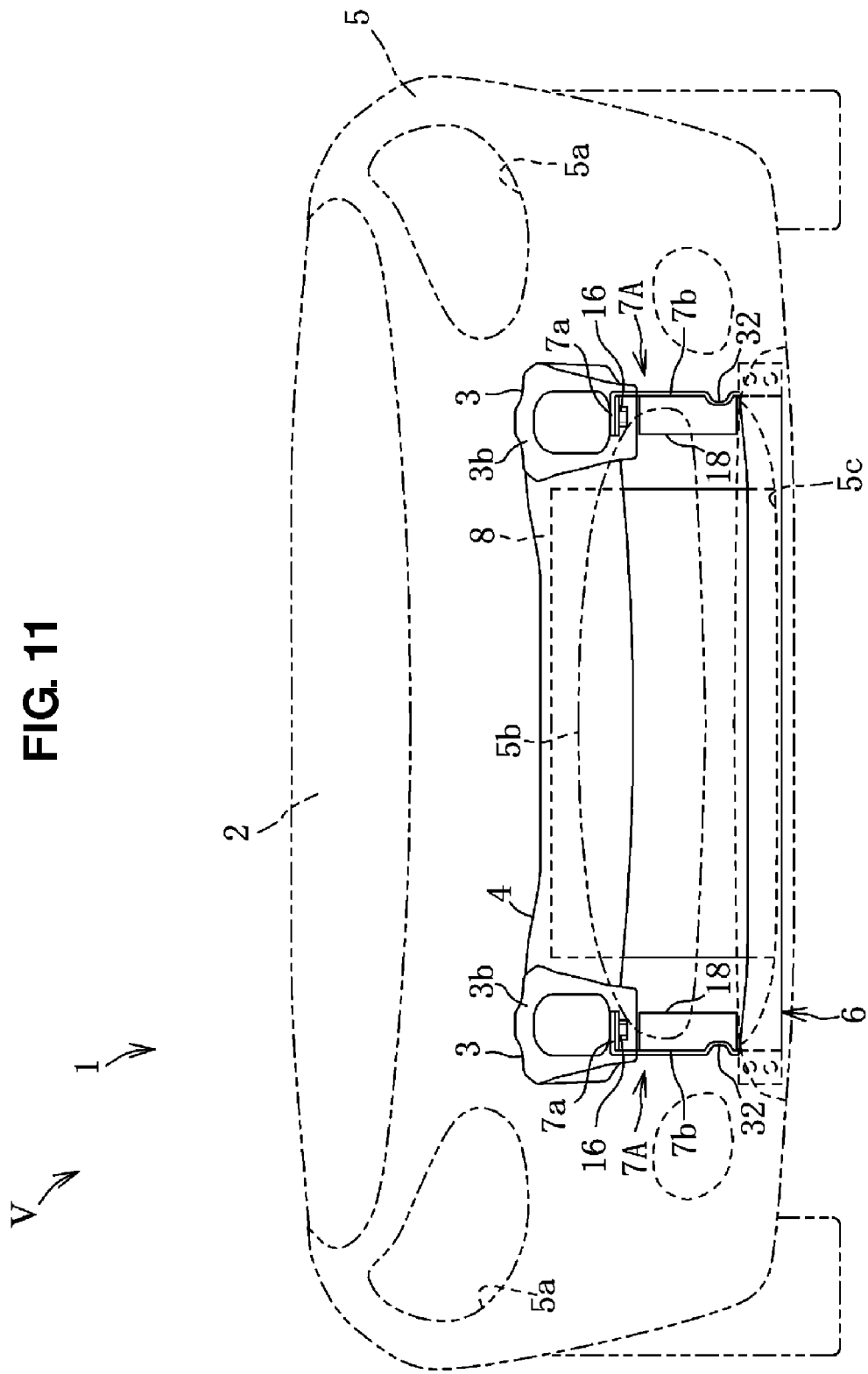
FIG. 11 is a sectional view, which corresponds to FIG. 3, according to the third embodiment.
Figure 12:
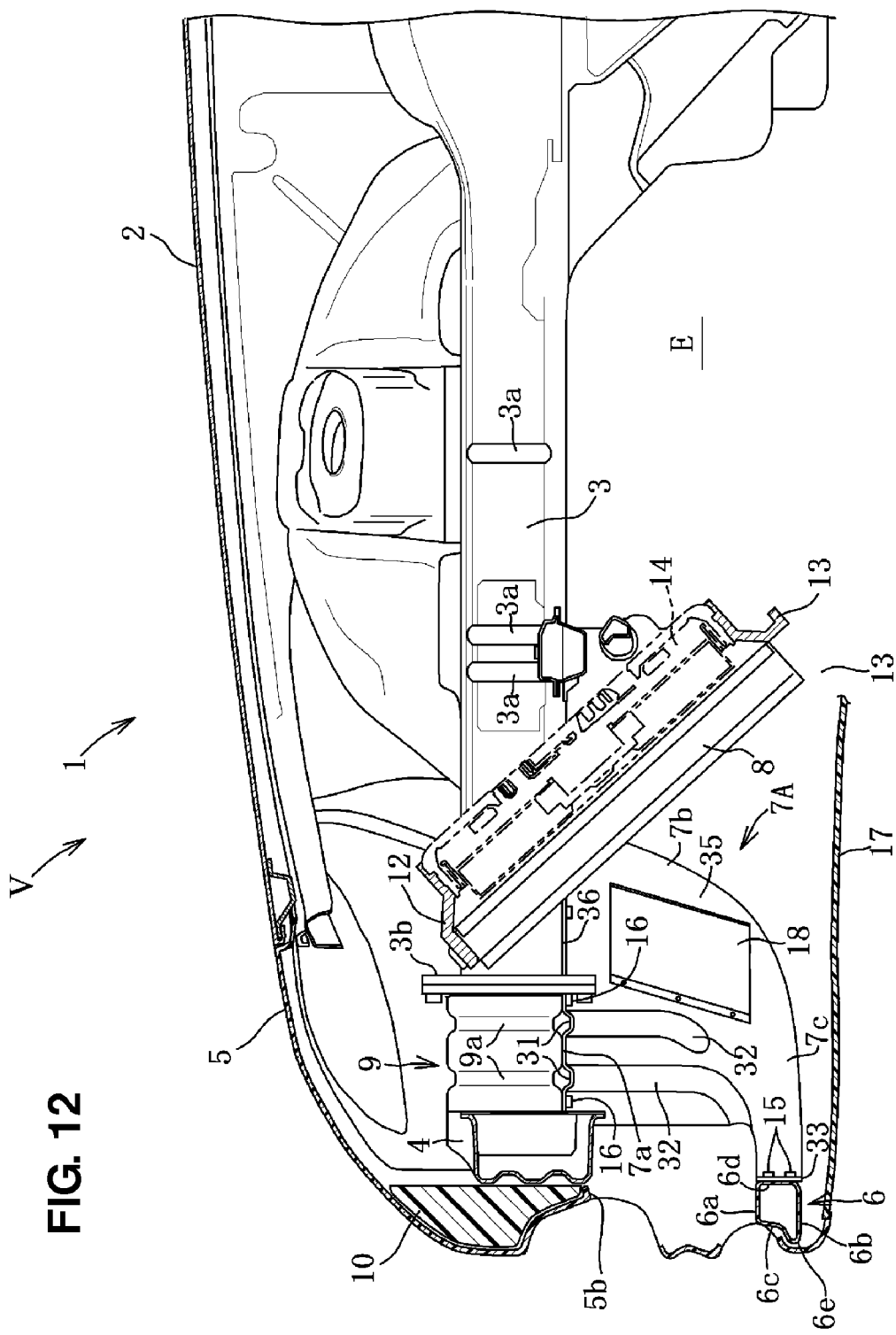
FIG. 12 is a sectional view, which corresponds to FIG. 4, according to a third embodiment.

A front body structure of a vehicle according to a third embodiment will be described referring to FIGS. 10 through 12. Herein, only different structure from the first embodiment will be described, and the same components as the first embodiment are denoted by the same reference characters, descriptions of which are omitted here.

Between the pair of the front side frames 3, the radiator 8 and the fan 14 for the radiator 8 are supported at the shroud upper 12 and the shroud lower 13. The radiator 8 arranged in the slant state is disposed so as to face to the traveling-air induction openings 5b, 5c of the bumper face 5.

A steel-plate made support member 7A comprises the attachment portion 7a to attach the support member 7A to the lower end face of the crush can 9, support body portion 7b, impact transmission portion 7c which transmits the impact load to the support body portion 7b and attaches the leg-part sweeping-away member 6, and so on. The both-side support members 7A have substantially the same structure, so the right-side support member 7A will be described.

The support body portion 7b is formed so as to bend from the outside end portion of the attachment portion 7a and extend downwardly, and includes the two-row beads 32 which are formed so as to be concaved toward the inside of the vehicle and extend vertically, a plate-shaped projecting portion 35 which projects in back of the beads 32, and so on. The front bead 32 curves forwardly at the lower portion of the support body portion 7b and extends up to the front end portion of the support body portion 7b. The rear bead 32 curves forwardly at the lower portion of the support body portion 7b and extends to a front portion of the support body portion 7b. Upper portions of the front bead 32 and the rear bead 32 extend vertically almost in parallel to each other.

The projection portion 35 extends from a position in back of the rear bead 32 to a position above and beside the radiator 8 provided in back of the flange 3b, and it is arranged below the front side frame 3 substantially in parallel to the front side frame 3. A rear end portion of the projection portion 35 curves forwardly. The longitudinal width of a lower part of the projection portion 35 is narrower than that of an upper part of that.

The projection portion 35 has an attachment portion 36 to attach the support member 7A to the lower end face of the front side frame 3 at its upper end portion. Thus, the both-side support members 7A are fixed to the respective crush cans 9 and the respective lower end faces of the front side frames 3 with the bolts 16, respectively. The impact transmission portion 7c curves forwardly from the lower end portion of the support body portion 7b.

A pair of traveling-air guide portions 18 is arranged between the traveling-air induction openings 5b, 5c and the radiator 8 so as to guide the traveling air passing through the induction openings 5b, 5c to the radiator 8. The traveling-air guide portion 18, which is made of a synthetic-resin plate, is positioned below the front side frame 3. The traveling-air guide portion 18 is connected to the projection portion 35 with bolts at its front side end, and it is disposed in a slant state so that its rear end approaches toward the center in the vehicle width direction. The left-side traveling-air guide portion 18 is configured to be similar to the right-side traveling-air guide portion 18.

Next, the operation and effect of the above-described front body structure according to the third embodiment will be described.

According to this front body structure, since the pair of traveling-air guide portion 18 is fixed to the respective support members 7A, the traveling air passing through the induction openings 5b, 5c can be effectively guided to the radiator 8, so that the cooling function of the radiator 8 can be improved. Further, since the traveling air which passes through on the outside of the radiator 8, that is, below the front side frame 3 is guided toward the center of the vehicle, the cooling function of the radiator 8 can be further improved.

Embodiment 4

Figure 13:
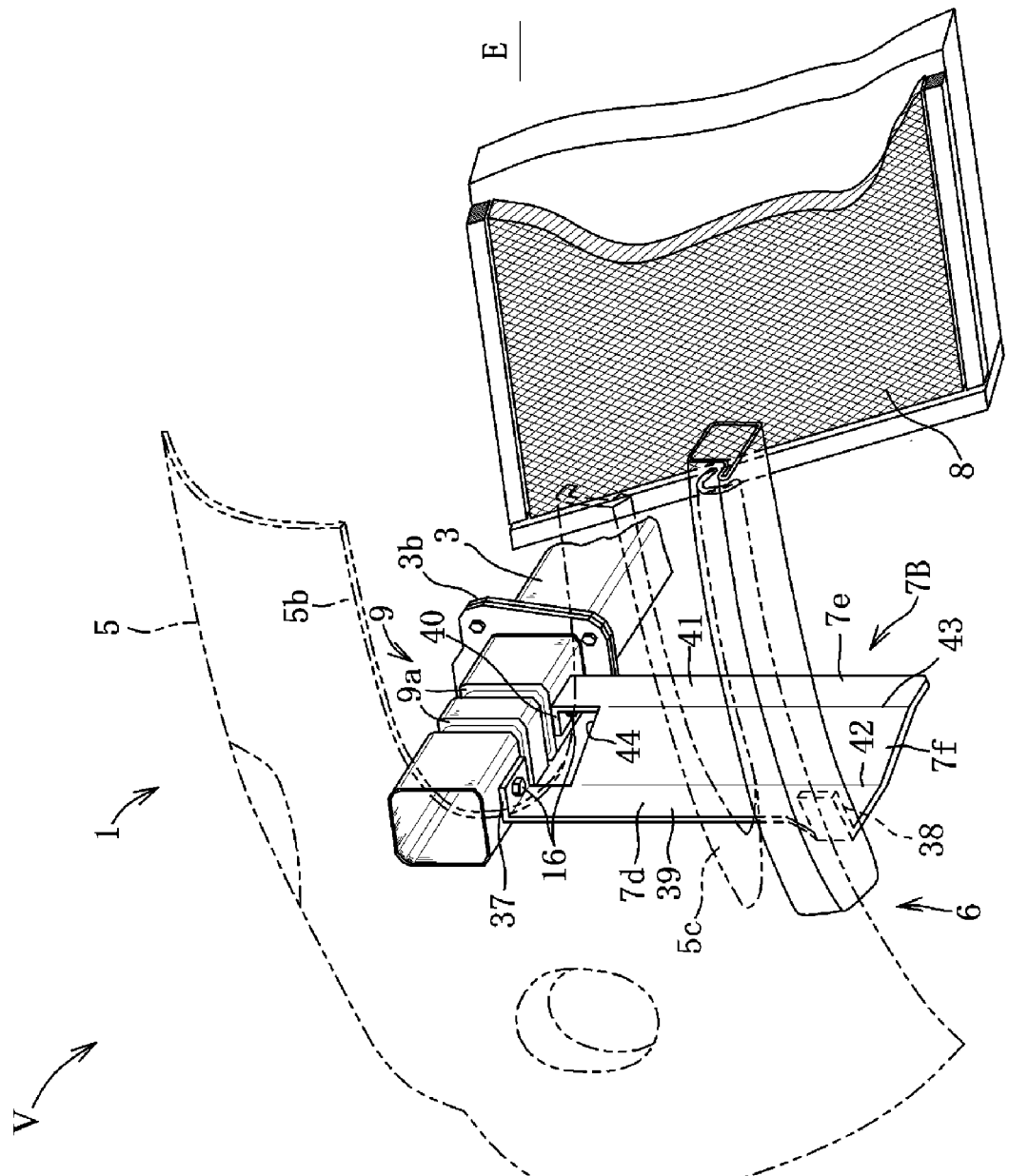
FIG. 13 is a perspective view of a major part of a right-half inside of a front body, omitting a shroud panel, when viewed obliquely from below, according to a fourth embodiment.
Figure 14:
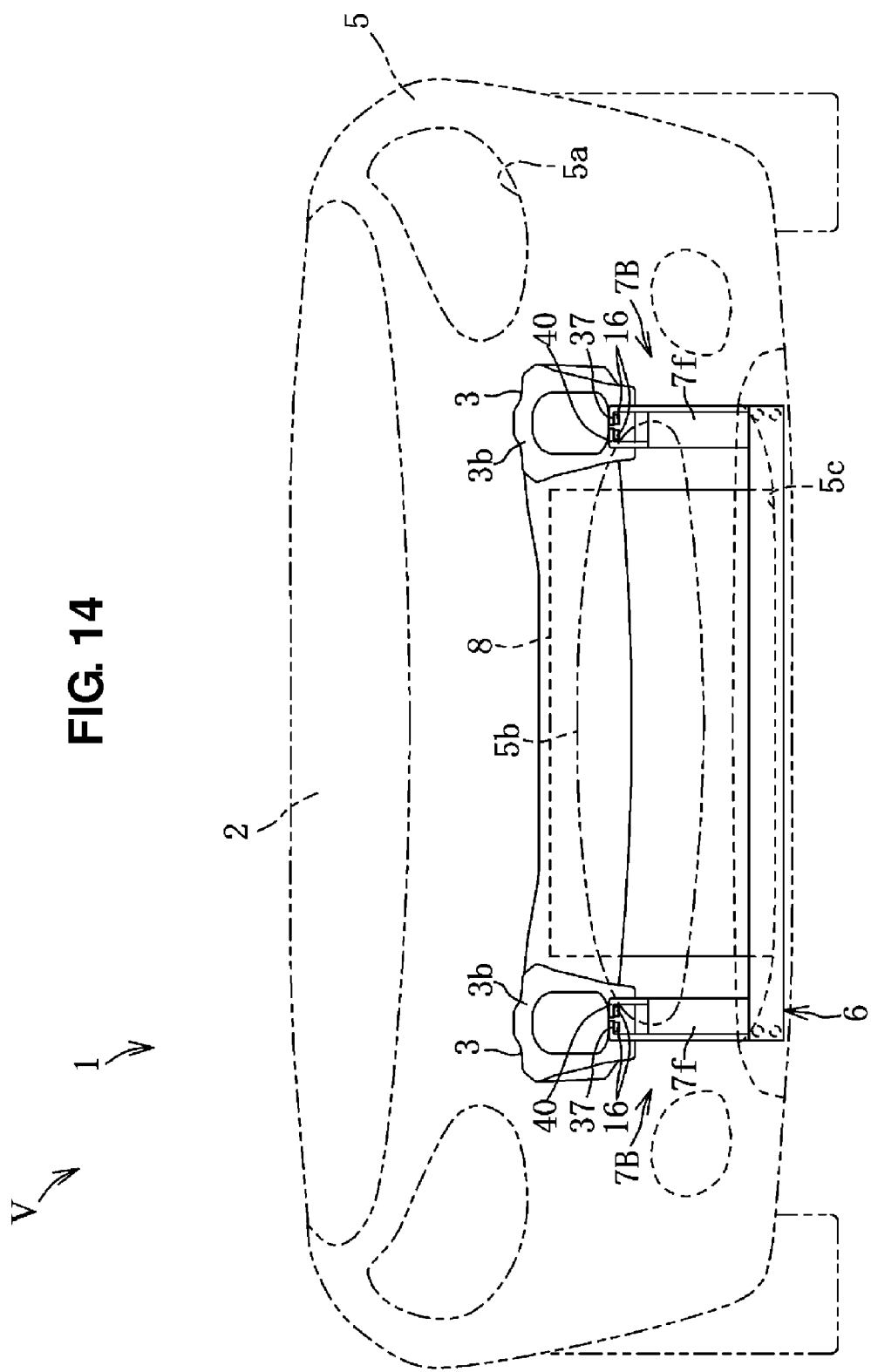
FIG. 14 is a sectional view, which corresponds to FIG. 3, according to the fourth embodiment.
Figure 15:
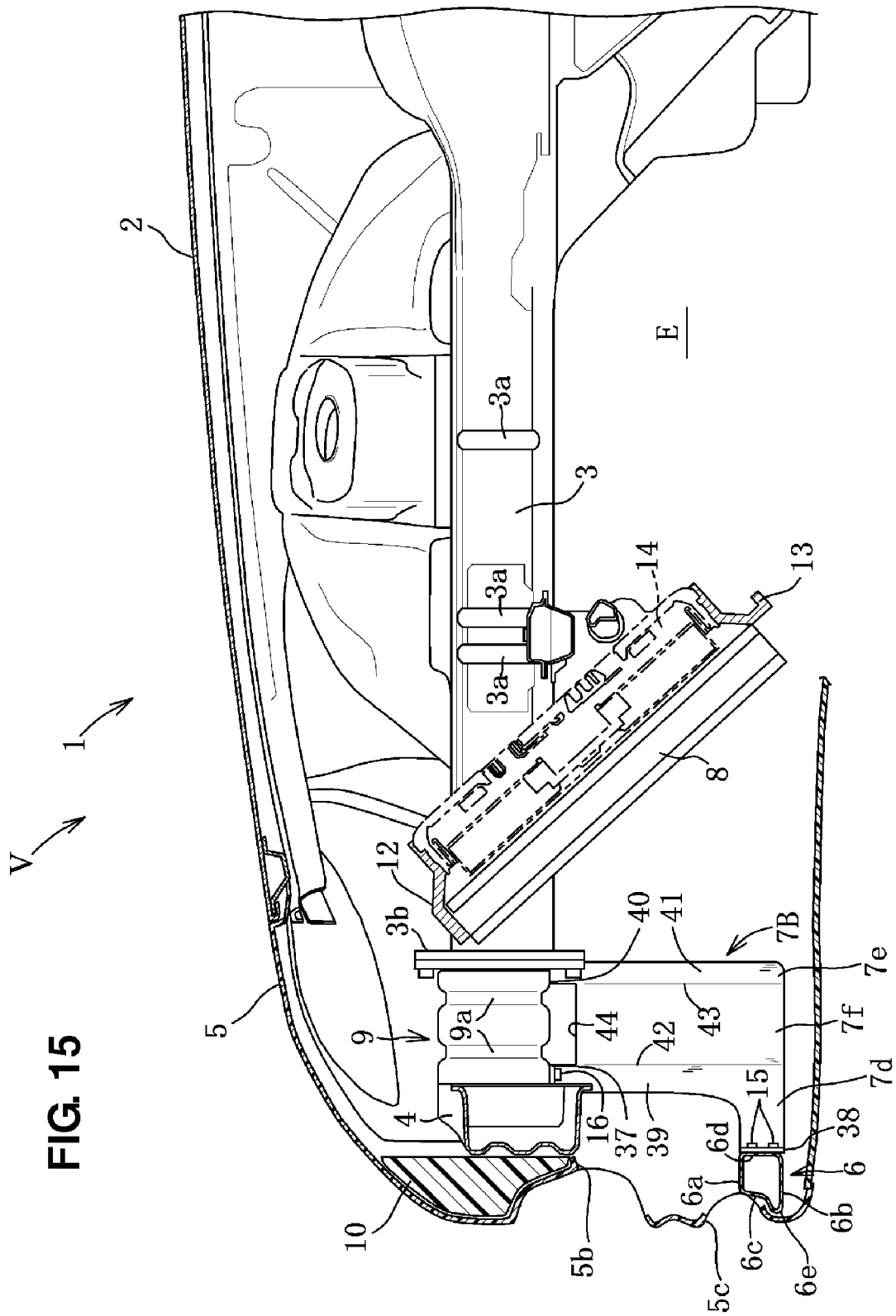
FIG. 15 is a sectional view, which corresponds to FIG. 4, according to the fourth embodiment.

A front body structure of a vehicle according to a fourth embodiment will be described referring to FIGS. 13 through 15. Herein, only different structure from the first embodiment will be described, and the same components as the first embodiment are denoted by the same reference characters, descriptions of which are omitted here.

A steel-plate made support member 7B comprises a front support portion 7d, a rear support portion 7e, a middle portion 7f which is formed between the front and rear support portions 7d, 7e, and so on. The both-side support members 7B are fixed to the lower end faces of the both-side crush cans 9 with the bolts 16. The both-side support members 7B have substantially the same structure, so the right-side support member 7B will be described.

The front support portion 7d comprises an attachment portion 37 which attaches the support member 7B to the crush can 9, a connection portion 38 which connects the leg-part sweeping-away member 6 with bolts, a front body portion 39 which interconnects the attachment portion 37 and the connection portion 38, and so on. The attachment portion 37 is fixed to an outside position of the lower end face of the crush can 9 with the bolts 16. The front body portion 39 bends downwardly from an outside end of the attachment portion 37. The connection portion 38 bends inwardly from a front end of a lower end portion of the front body portion 39.

The rear support portion 7e comprises an attachment portion 40 which attaches the support member 7B to the crush can 9, a rear body portion 41 which is positioned below the attachment portion 40, and so on. The attachment portion 40 is fixed to an inside position of the lower end face of the crush can 9. The rear body portion 41 bends downwardly from an inside end of the attachment portion 40.

The middle portion 7f is positioned right below the front side frame and extends so as to slant obliquely rearwardly and inwardly. The middle portion 7f is a portion corresponding to a border with the front support member 7d, and comprises a V-shaped bending portion 42 (impact absorption portion) which faces to the vehicle inside and extends vertically, a V-shaped bending portion 43 (impact absorption portion) which is a portion corresponding to a border with the rear support portion 7e and faces to the vehicle inside and extends vertically, an upper opening 44 which is formed at an upper end portion of he middle portion 7f between the attachment portion 37 and the attachment portion 40, and so on.

As described above, since the upper opening 44 is formed between the attachment portion 37 and the attachment portion 40 and the middle portion 7f slants relative to the vehicle width direction, the middle portion 7f crushes according to the crush deformation of the crash can 9 from the collision of the vehicle V so that the both V-shaped bending portions 42, 43 bend. Thereby, the crush deformation of the crush can 9 is not hindered by the support member 7B. Accordingly, the support member 7B can support the leg-part sweeping-away member 6 at the front side frame 3 properly, without hindering the impact-energy absorption of the crush can 9.

Further, when the vehicle collides with the pedestrian, since the leg-part sweeping-away member 6 is disposed below the impact absorbing member 10 and behind the traveling-air induction opening 5c which corresponds to the height of the pedestrian's leg part, the projection 6e hits against the leg part of the pedestrian via the bumper face 5. The impact load is inputted from the connection portion 38 to the front support portion 7d. Herein, the V-shaped bending portion 42 bends so that the front support portion 7d moves outwardly, thereby absorbing part of the impact load. The rest of the impact load which has not been absorbed by the deformation of the V-shaped bending portion 42 and the front support portion 7d is absorbed by the V-shaped bending portion 42 bending so that the rear support portion 7e moves inwardly. Thus, the impact load which is greater than the necessary impact energy for putting the pedestrian on the engine hood 2 is absorbed by the bending deformation of the V-shaped bending portions 42, 43, so that the impact load acting on the pedestrian can be properly small.

Moreover, since the middle portion 7f slants obliquely rearwardly and inwardly, the traveling air passing through the traveling-air induction openings 5b, 5c can be guided to the radiator 8, so that the cooling function of the radiator 8 can be further improved.

Embodiment 5

Figure 16:
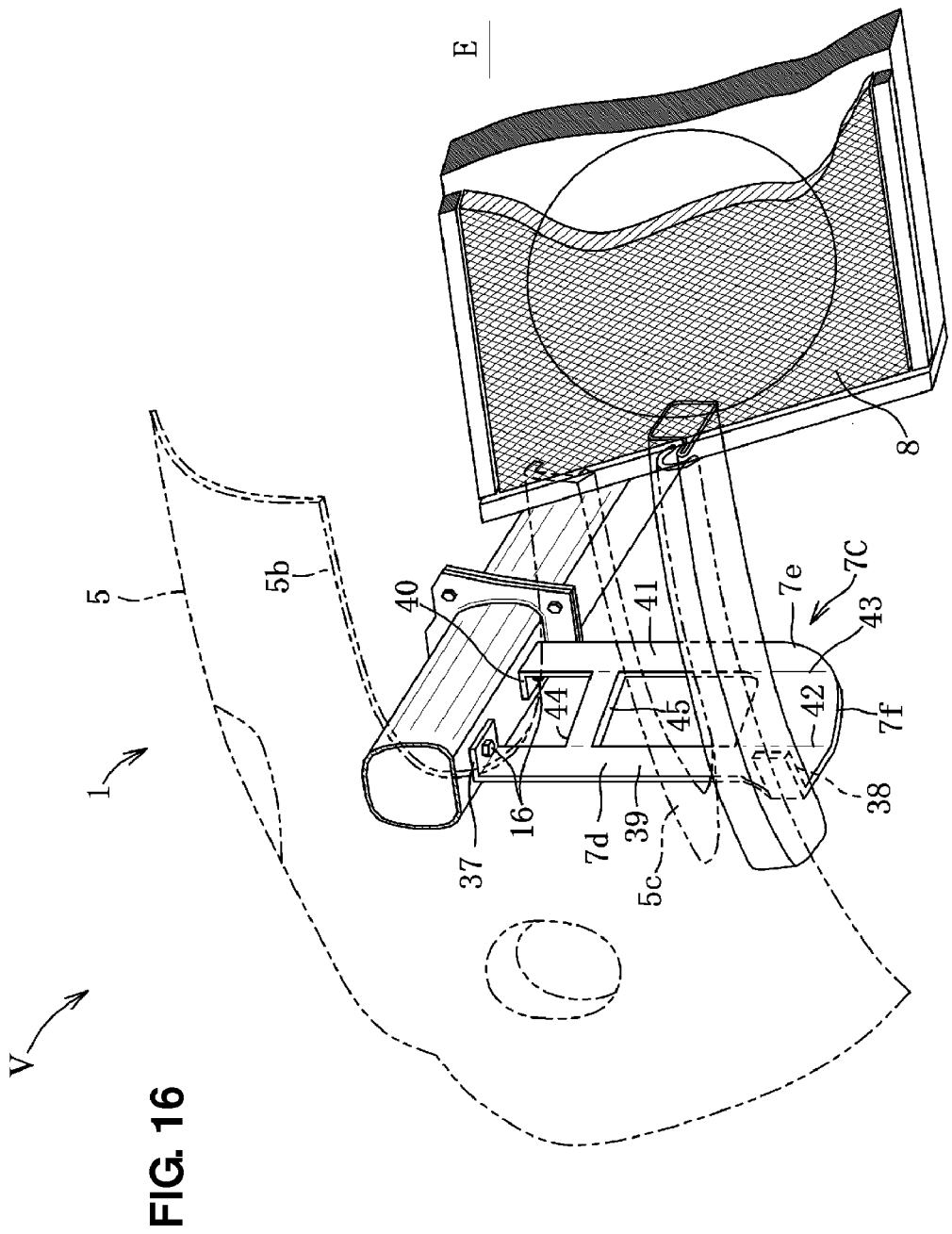
FIG. 16 is a perspective view of a major part of a right-half inside of a front body, omitting a shroud panel, when viewed obliquely from the front, according to a fifth embodiment.
Figure 17:
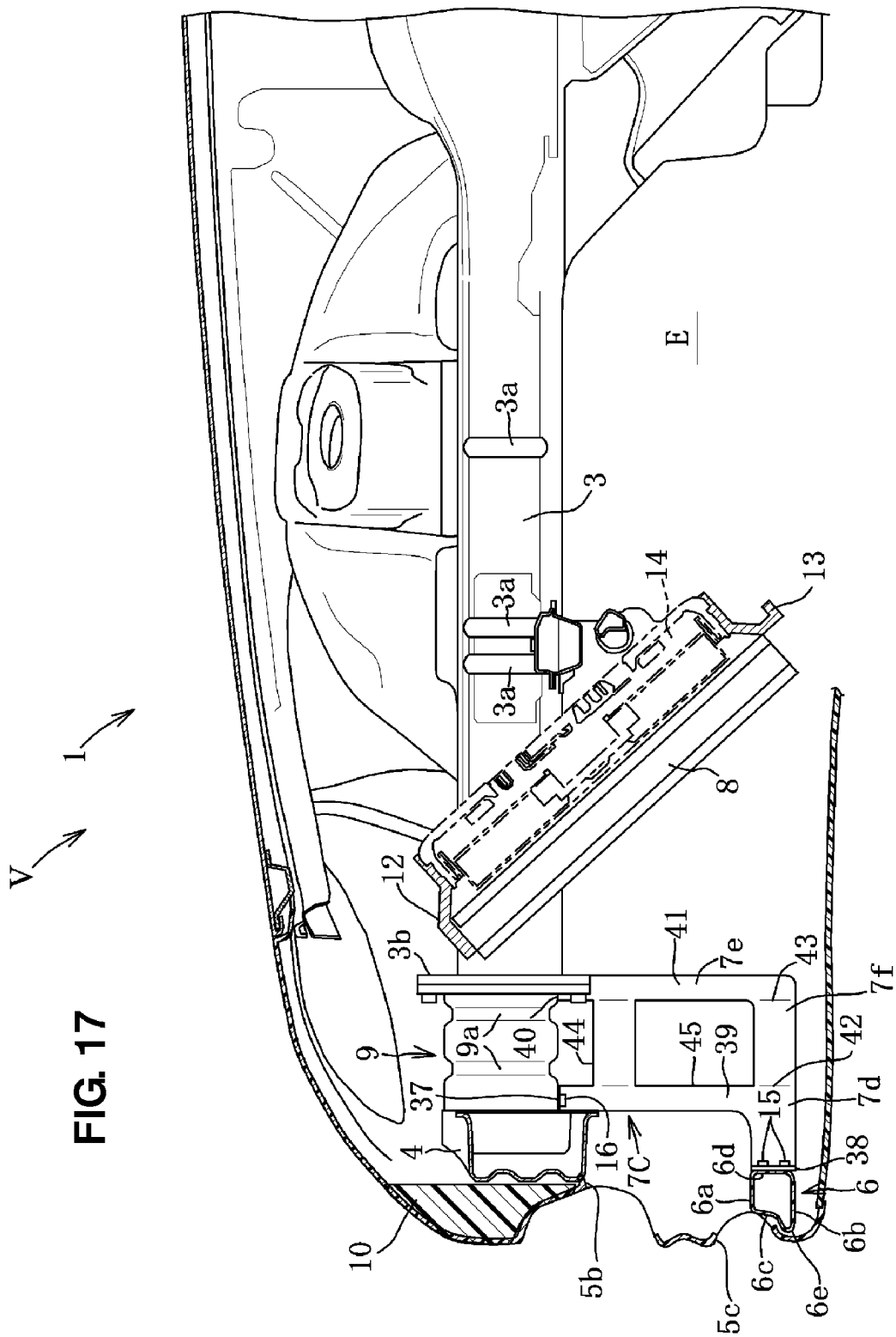
FIG. 17 is a sectional view, which corresponds to FIG. 4, according to the fifth embodiment.
Figure 18:
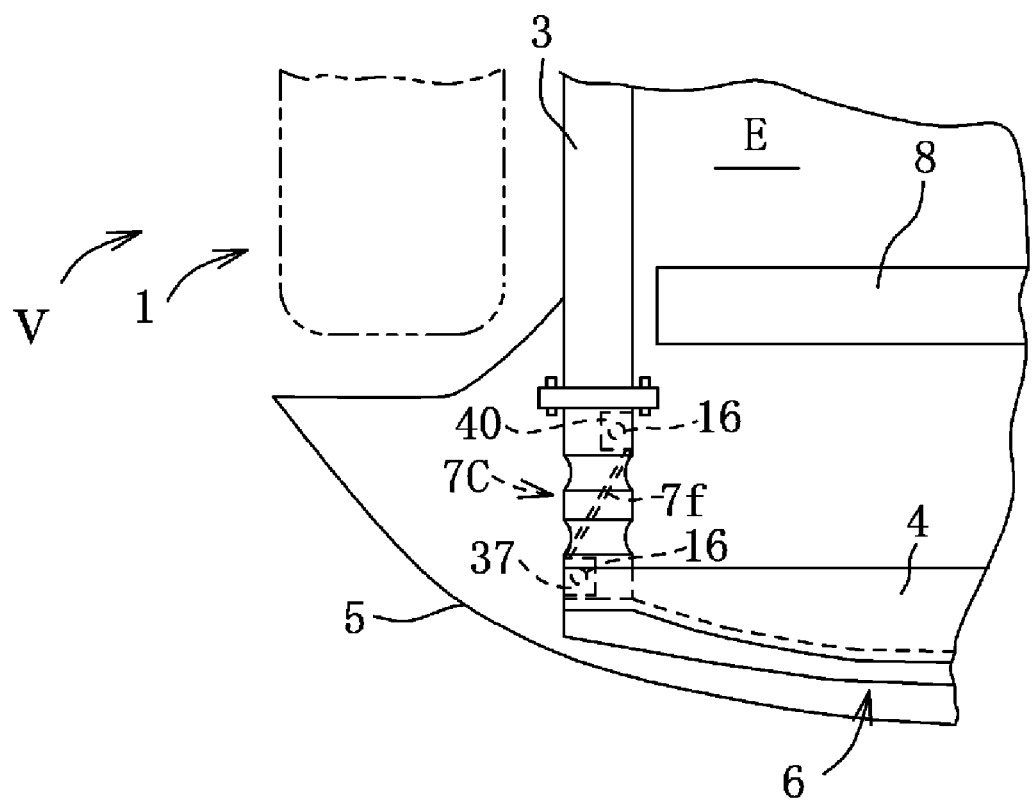
FIG. 18 is a plan view of a right-side front vehicle body according to the fifth embodiment.

A front body structure of a vehicle according to a fifth embodiment will be described referring to FIGS. 16 through 18. Herein, only different structure from the fourth embodiment will be described, and the same components as the fourth embodiment are denoted by the same reference characters, descriptions of which are omitted here.

A steel-plate made support member 7C comprises the front support portion 7d, the rear support portion 7e, the middle portion 7f which is formed between the front and rear support portions 7d, 7e, and so on. The both-side support members 7C are fixed to the lower end faces of the both-side crush cans 9 with the bolts 16.

The middle portion 7f is positioned right below the lower end face of the crush can 9 and extends so as to slant obliquely rearwardly and inwardly. The middle portion 7f comprises the V-shaped bending portion 42, the V-shaped bending portion 43, the upper opening 44, a central opening 45 which is formed below the upper opening 44, and so on. The central opening 45 has a size which can absorb, along with the V-shaped bending portions 42, 43, the impact load greater than the necessary collision energy for putting the pedestrian on the engine hood 2 at the collision with the pedestrian.

As described above, the support member 7C can support the leg-part sweeping-away member 6 at the front side frame 3 properly, without hindering the impact-energy absorption of the crush can 9. Further, since the impact load is absorbed by the bending deformation of the V-shaped bending portions 42, 43, the impact load acting on the pedestrian can be made small. Moreover, the light weight of the support member 7C can be achieved by the central opening 45, so that the vehicle weight can be decreased.

Embodiment 6

Figure 19:
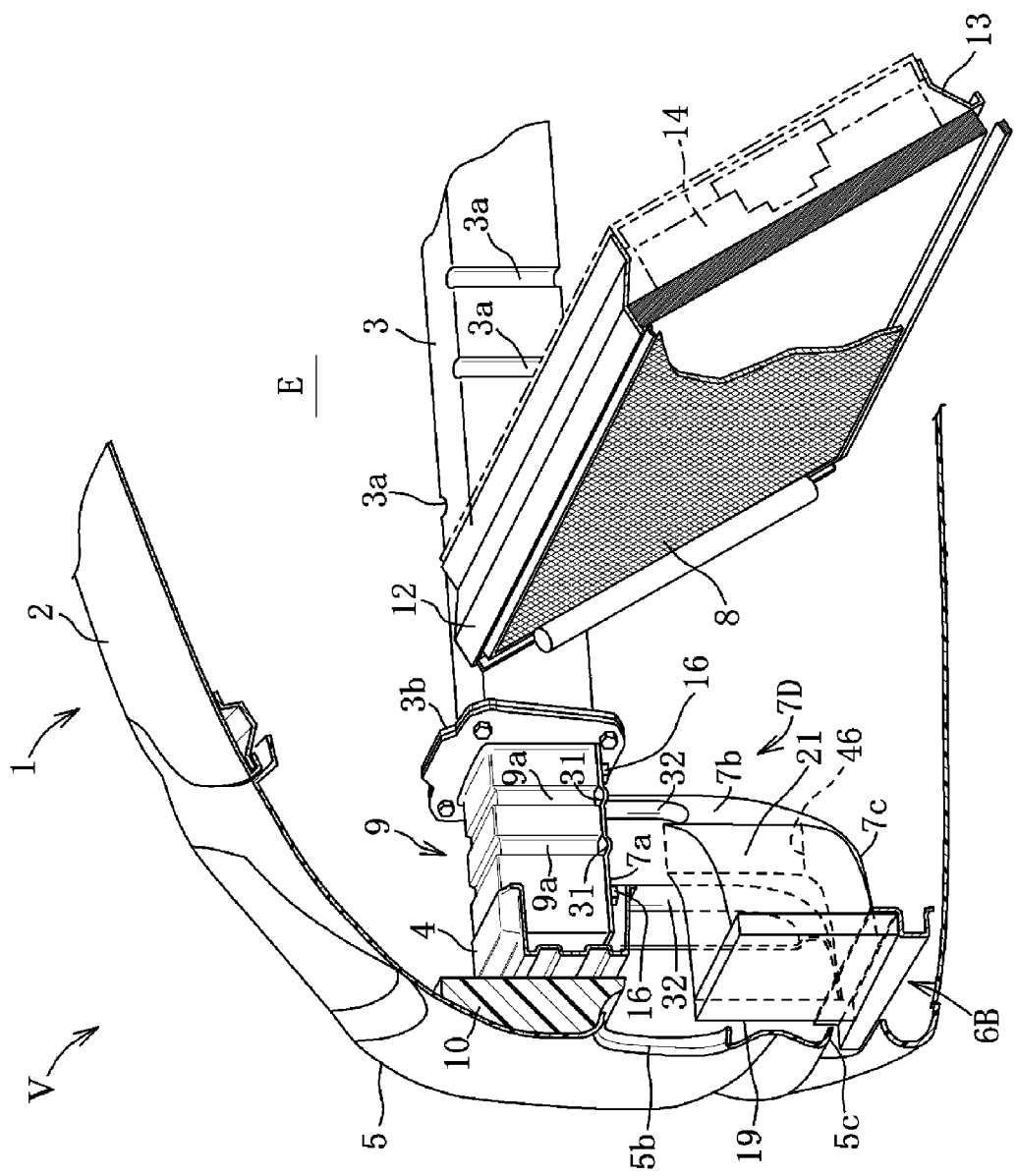
FIG. 19 is a perspective view of a major part of a right-half inside of a front body, omitting a shroud panel, according to a sixth embodiment.

A front body structure of a vehicle according to a sixth embodiment will be described referring to FIGS. 19 and 20. Herein, only different structure from the first embodiment will be described, and the same components as the first embodiment are denoted by the same reference characters, descriptions of which are omitted here.

The front body structure of the vehicle V comprises the engine hood 2, the pair of front side frames 3, the bumper reinforcement 4, the bumper face 5, a leg-part sweeping-away member 6B (laterally-extending member), a support member 7D which supports the leg-part sweeping-away member 6B at the front side frames 3, the radiator 8, an intercooler 19 (as a second heat exchanger added to the radiator 8) which cools an intake air heated through compression, and so on.

The leg-part sweeping-away member 6B is disposed below the impact absorbing member 10 and behind the traveling-air induction opening 5c which corresponds to the height of the pedestrian's leg part. The longitudinal rigidity of the leg-part sweeping-away member 6B is greater than that of the support member 7D. The leg-part sweeping-away member 6B has a U-shaped cross section, and is attached to the both-side support members 7D with the bolts 15.

The steel-plate made support member 7D comprises the attachment portion 7a, support body portion 7d, impact transmission portion 7c, and so on. The both-side support members 7D are fixed to the lower end faces of the both-side crush cans 9 with the bolts 16. The attachment portion 7a includes the two-row beads 31 which are formed facing to the two grooves 9a so as to extend perpendicularly to the vehicle longitudinal direction and be concaved toward the opposite side to the grooves 9a, respectively, and so on. When the support member 7D is fixed to the lower end face of the crush can 9, the attachment portion 7a is arranged in parallel to a face perpendicular to the vehicle vertical direction, and each bead 31 is arranged in perpendicular to the vehicle longitudinal direction.

The support body portion 7b is formed so as to bend perpendicularly from the outside end portion of the attachment portion 7a, and includes the two-row beads 32 which are formed so as to be concaved toward the inside of the vehicle and extend vertically, an opening 46 (an exhaust port), and so on. The front bead 32 extends downwardly continuously from the outside end portion of the front bead 31 and then curves forwardly at the lower portion of the support body portion 7b and extends up to the front end portion of the support body portion 7b. The rear bead 32 extends downwardly continuously from the outside end portion of the rear bead 31 and curves forwardly at the lower portion of the support body portion 7b. The opening 46 is formed in a rectangular shape and positioned at a portion between the front and rear beads 32 so as to penetrate the support body portion 7b.

The intercooler 19 is arranged near the right end portion of the leg-part sweeping-away member 6B, and fixed via an attachment bracket (not illustrated). In back of the intercooler 19 is disposed a synthetic-resin made duct 21 (a guide flow passage) which guides the traveling air passing through the intercooler 19 to a wheel house 20. The duct 21, which is of a square cylindrical shape, connects a back face of the intercooler 19 and the above-described opening 46.

Figure 20:
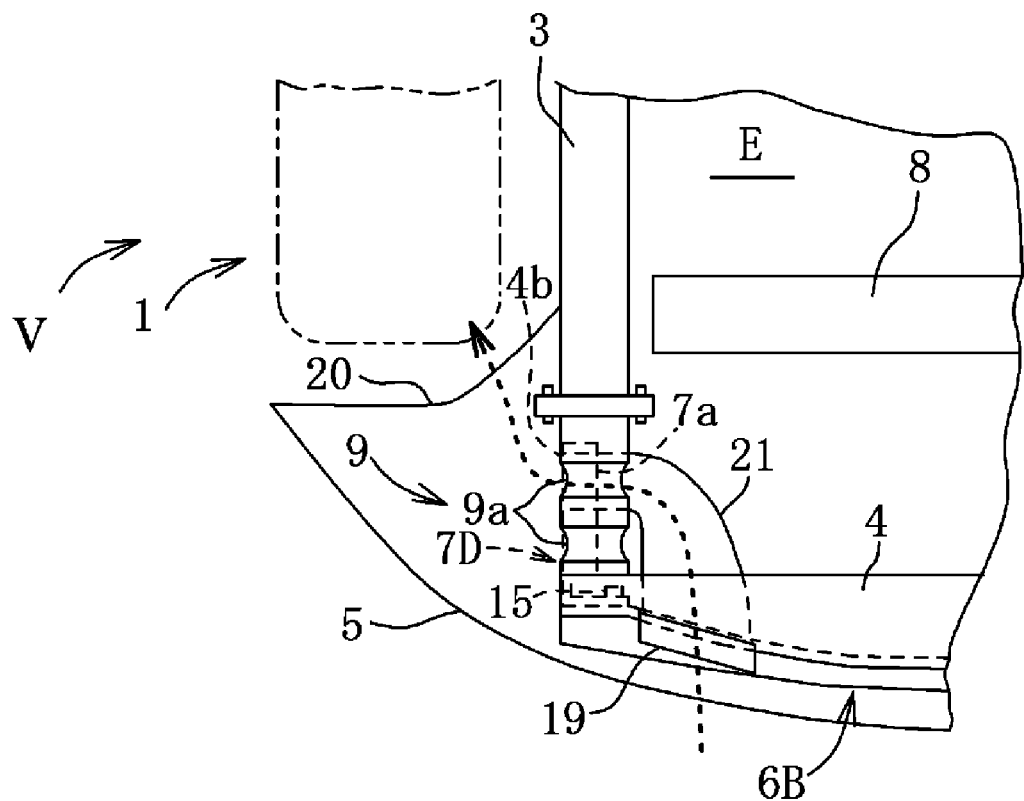
FIG. 20 is an explanatory diagram explaining a flow of traveling air.

As shown by an arrow in FIG. 20, the traveling air which has been heat-exchanged with the intercooler 19 is guided through the duct 21 to the wheel house 20, and then discharged to the outside of the vehicle V. Thus, the traveling air before the heat exchange with the radiator 8 is supplied to the intercooler 19, and also it is prevented to guide the traveling air heated through the heat exchange with the intercooler 19 is supplied to the radiator 8, so that the proper cooling function of the both heat exchangers 8, 19 can be kept. Herein, since the duct 21 is made of synthetic resin, it may not provide any improper influence to the crush deformation of the support member 7D.

As described above, the present embodiment can perform the similar operation and effects to the first embodiment basically. Further, since the longitudinal rigidity of the leg-part sweeping-away member 6B is greater than that of the support member 7D, the adjustment of the impact absorption can be conducted easily by setting the beads 32 of the support member 7D and the like. Moreover, the proper cooling function of the radiator 8 and the intercooler 19 can be kept.

Embodiment 7

Figure 21:
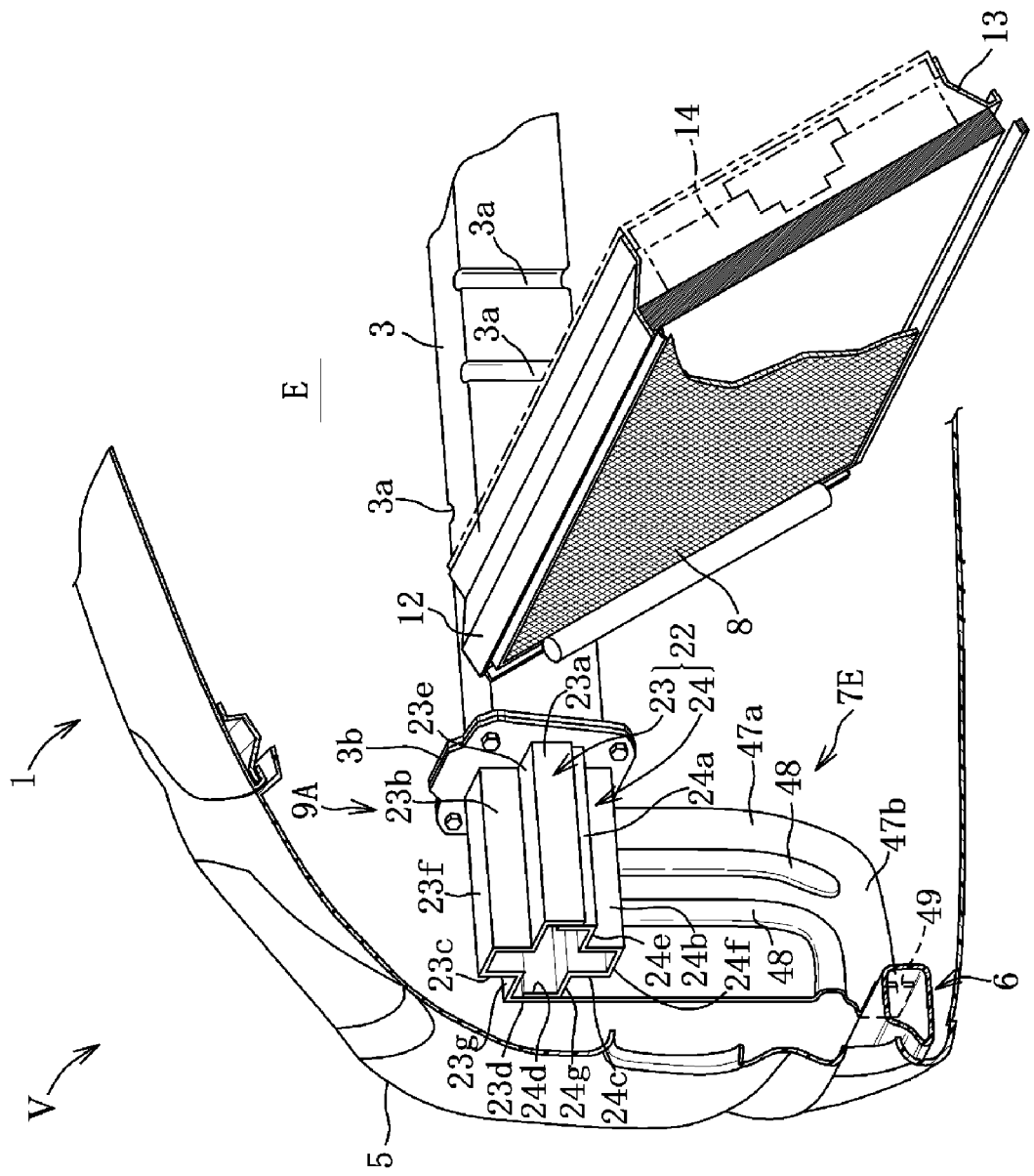
FIG. 21 is a perspective view of a major part of a right-half inside of a front body, omitting a shroud panel, according to a seventh embodiment.
Figure 22:
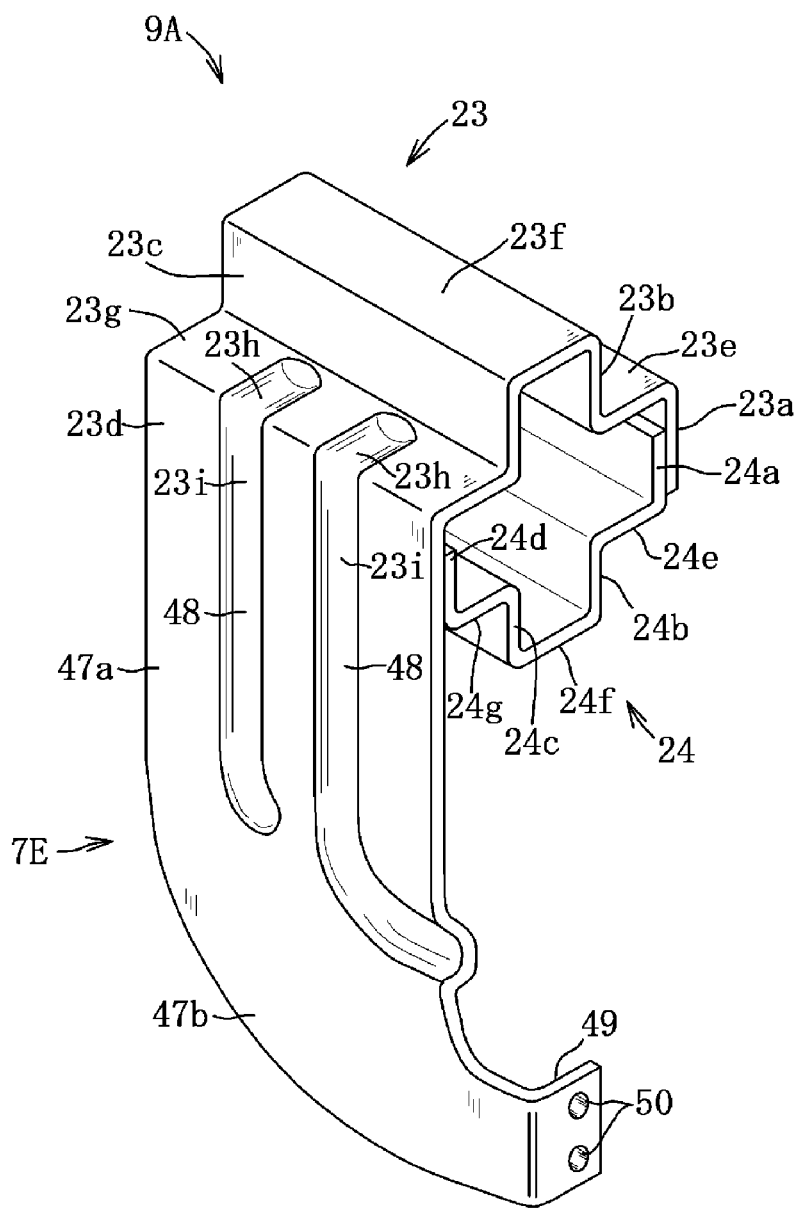
FIG. 22 is a perspective view, which corresponds to FIG. 5, according to the seventh embodiment.

A front body structure of a vehicle according to a seventh embodiment will be described referring to FIGS. 21 and 22. Herein, only different structure from the first embodiment will be described, and the same components as the first embodiment are denoted by the same reference characters, descriptions of which are omitted here.

A pair of crush cans 9A is attached to the flanges 3b of the front side frames 3. A support member 7E which supports the leg-part sweeping-away member 6 is integrally formed with each crush can 9A. The both crush cans 9A have a similar structure, so the right-side crush can 9A will be described.

The crush can 9A comprises an upper panel 23 and a lower panel 24, which form together a cross-shaped closed cross section which extends in the vehicle longitudinal direction. The upper panel 23 comprises a vertical face portion 23a located on the vehicle inside, a horizontal face portion 23e which connects an upper end portion of the vertical face portion 23a and a lower end portion of a vertical face portion 23b, the vertical face portion 23b which connects an outside end portion of the horizontal face portion 23e and an inside end portion of a horizontal face portion 23f, the horizontal face portion 23f which connects an upper end portion of the vertical face portion 23b and an upper end portion of a vertical face portion 23c, the vertical face portion 23c which connects an outside end portion of the horizontal face portion 23f and an inside end portion of a horizontal face portion 23g, the horizontal face portion 23g which connects a lower end portion of the vertical face portion 23c and an upper end portion of a vertical face portion 23d, the vertical face portion 23d which extends downwardly from an upper end portion of the horizontal face portion 23g, and so on.

Two-row beads 23h are formed on the horizontal face portion 23g so as to extend perpendicularly to the vehicle longitudinal direction and be concaved toward the inside of the crush can 9A. On the vertical face portion 23d are formed two-row beads 23i which are continuous from the above-described beads 23h and concaved inwardly and extend downwardly, respectively.

The lower panel 24 comprises a vertical face portion 24a located on the vehicle inside, a horizontal face portion 24e which connects a lower end portion of the vertical face portion 24a and an upper end portion of a vertical face portion 24b, the vertical face portion 24b which connects an outside end portion of the horizontal face portion 24e and an inside end portion of a horizontal face portion 24f, the horizontal face portion 24f which connects a lower end portion of the vertical face portion 24b and a lower end portion of a vertical face portion 24c, the vertical face portion 24c which connects an outside end portion of the horizontal face portion 24f and an inside end portion of a horizontal face portion 24g, the horizontal face portion 24g which connects an upper end portion of the vertical face portion 24c and a lower end portion of a vertical face portion 24d, the vertical face portion 24d which extends downwardly from an upper end portion of the horizontal face portion 24g, and so on.

The support member 7E extends downwardly from a lower end of the vertical face portion 23d so as to be informed integrally with the crush can 9A. The support member 7E comprises a support body portion 47a and an impact transmission portion 47b. Two-row beads 48 which are concaved inwardly and extend vertically are formed at the support body portion 47a.

The front bead 48 extends downwardly continuously from a lower end of the front bead 23i, and curves forwardly at a lower portion of the support body portion 47a and extends up to a front end portion of the support body portion 47a. The rear bead 48 extends downwardly continuously from a lower end portion of the rear bead 23i, and curves forwardly at a lower portion of the support body portion 47a. A bead depth and a vertical length of each bead 48 are set so as to absorb the impact load which is greater than the collision energy necessary to put the pedestrian on the engine hood 2 when the vehicle collides with the pedestrian.

The impact transmission portion 47b is formed so as to curve forwardly from a lower end portion of the support body portion 47a. The impact transmission portion 47b includes an attachment portion 49 which is formed so as to bend inwardly from its front end portion for attaching the leg-part sweeping-away member 6, a pair of bolt holes 50 which is formed at the attachment portion 49, and so on. The leg-part sweeping-away member 6 which is fixed to the front surface of the attachment portion 49 is fixed to the support member 7E by bolts (not illustrated) inserted through the bolt holes 50.

As described above, the present embodiment can perform the similar effects to the first embodiment basically. Further, since the vertical face portion 23d of the crush can 9A extends downwardly and is formed integrally with the support member 7E to support the leg-part sweeping-away member 6, it may be unnecessary to provide any particular attachment portion for the support member 7E, so that the reduction of the vehicle weight and the easy control of crush deformation of the crush can 9A can be achieved.

Embodiment 8

Hereinafter, a modified embodiment of the above-described crush can 9A which is formed integrally with the support member supporting the leg-part sweeping-away member 6 will be described referring to FIG. 23. Herein, only different structure from the crush can 9A of the seventh embodiment will be described, and the same components as the seventh embodiment are denoted by the same reference characters, descriptions of which are omitted here. A pair of crush canes has the similar structure, so the right-side one will be described.

Figure 23:
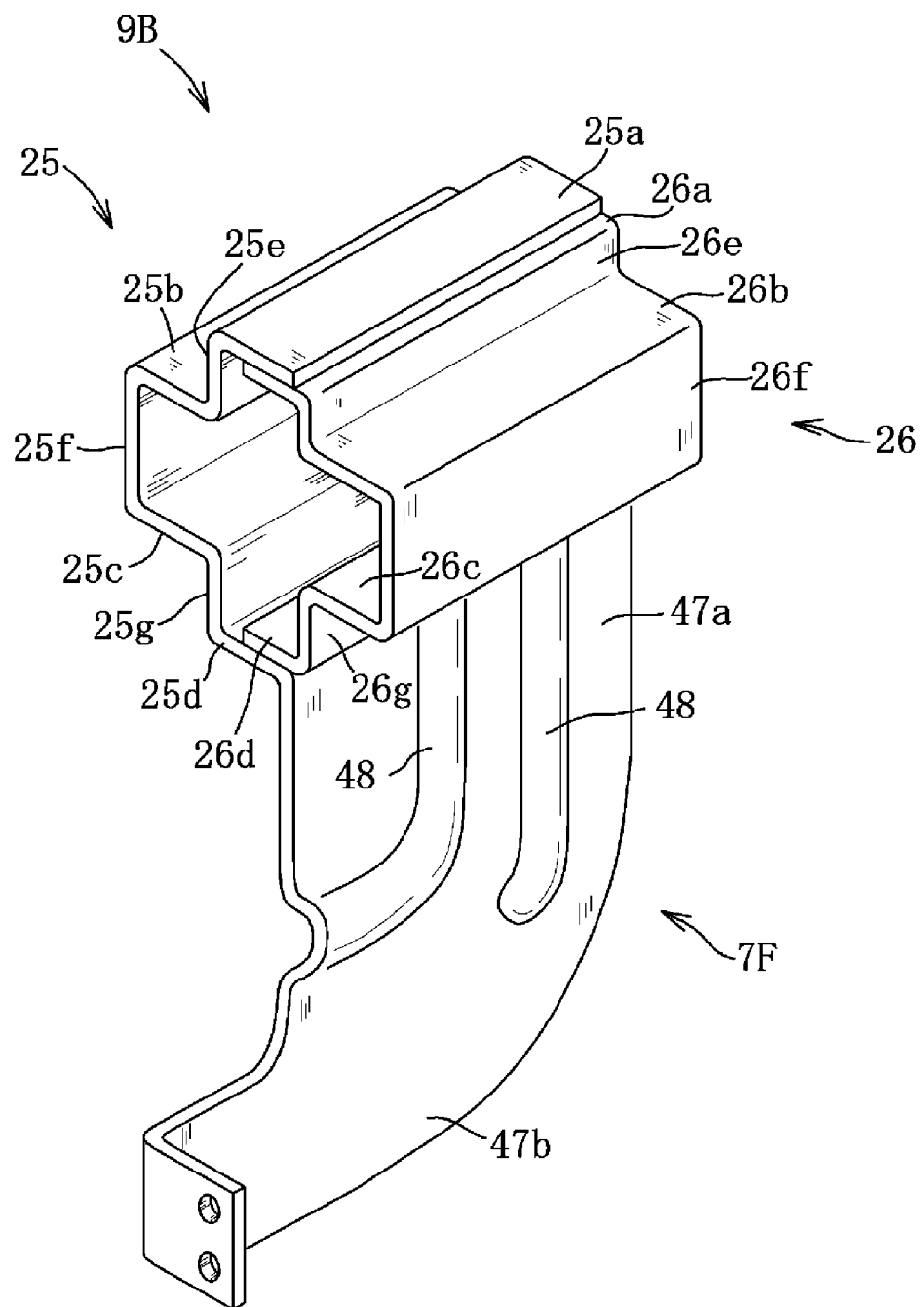
FIG. 23 is a perspective view of a crush can which is integrally formed with a support member according to an eighth embodiment.

As shown in FIG. 23, a crush can 9B comprises an outer panel 25 and an inner panel 26, which form together a cross-shaped closed cross section which extends in the vehicle longitudinal direction.

The upper panel 25 comprises a horizontal face portion 25a, a vertical face portion 25e, a horizontal face portion 25b, a vertical face portion 25f, a horizontal face portion 25c, a vertical face portion 25g, a horizontal face portion 25d, and so on. The inner panel 26 comprises a horizontal face portion 26a, a vertical face portion 26e, a horizontal face portion 26b, a vertical face portion 26f, a horizontal face portion 26c, a vertical face portion 26g, a horizontal face portion 26d, and so on. The longitudinally-extending closed cross section of a crush can 7F is formed by welding the horizontal face portion 25a to the horizontal face portion 26e, and the horizontal face portion 25d to the horizontal face portion 26d.

The support member 7F is formed integrally with the outer panel 25 so as to bend from an inside end of the horizontal face portion 25d and extend downwardly. The support member 7F comprises a support body portion 47a and an impact transmission portion 47b. Two-row beads 48 which are concaved inwardly and extend vertically area formed at the support body portion 47a. Herein, any bead which extends perpendicularly to the vehicle longitudinal direction may be formed at the face portions 25a-25g, 26a-26b of the crush can 9B at need.

As described above, since the vertical face portion 25d of the crush can 9B is formed integrally with the support member 7F to support the leg-part sweeping-away member 6, it may be unnecessary to provide any particular attachment portion for the support member 7F, so that the reduction of the vehicle weight and the easy control of crush deformation of the crush can 9B can be achieved. Further, since the attachment portion of the support member 7F to the leg-part sweeping-away member 6 can be arranged on the inside in the vehicle width direction, the design flexibility of the vehicle can be increased.

Embodiment 9

A front body structure of a vehicle according to a ninth embodiment will be described referring to FIGS. 24 and 30. Herein, mainly different structure from the first embodiment will be described, and the same components as the first embodiment are denoted by the same reference characters, descriptions of which are omitted here.

Figure 25:
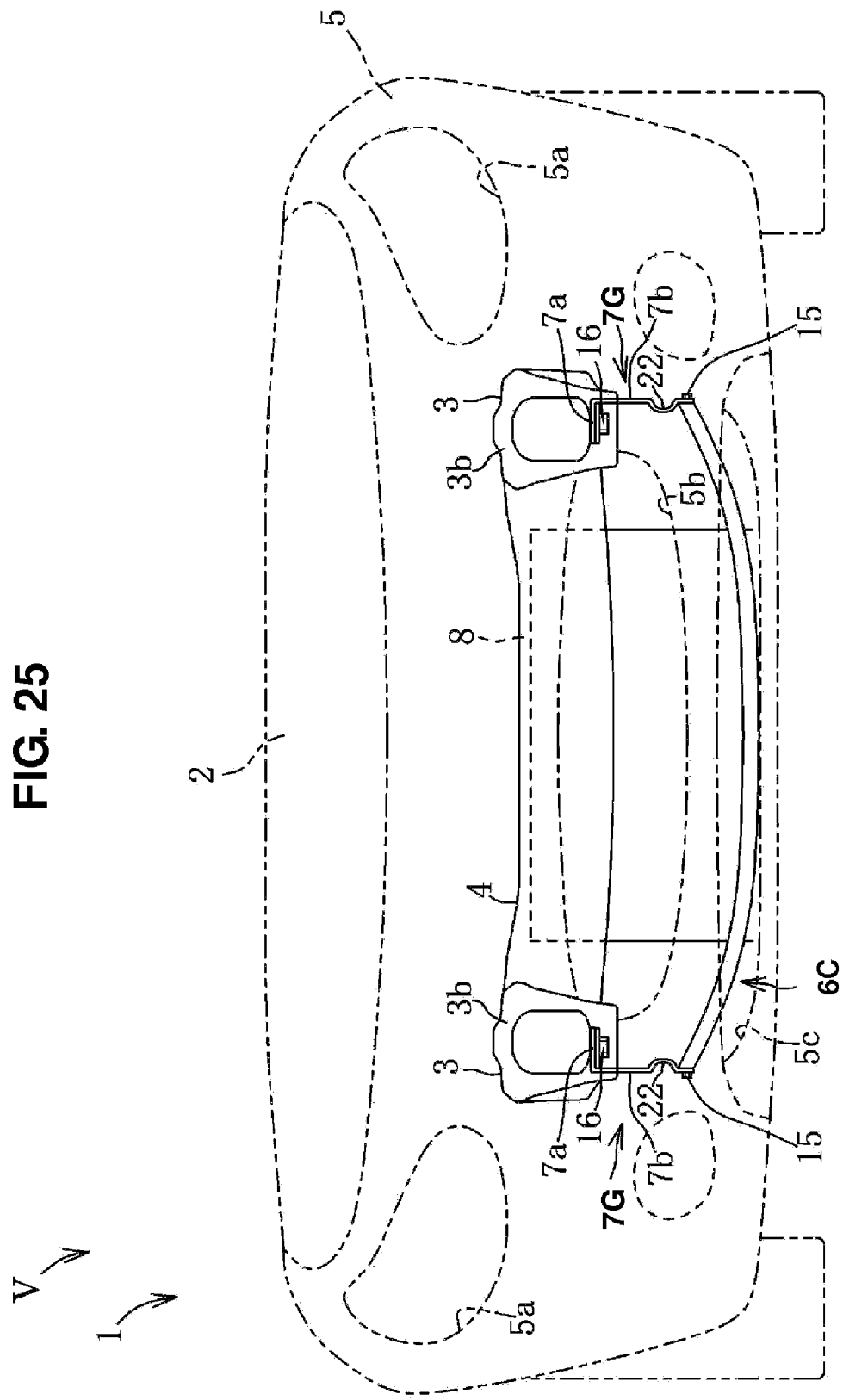
FIG. 25 is an elevation view of the vehicle body, omitting the bumper face.
Figure 26:
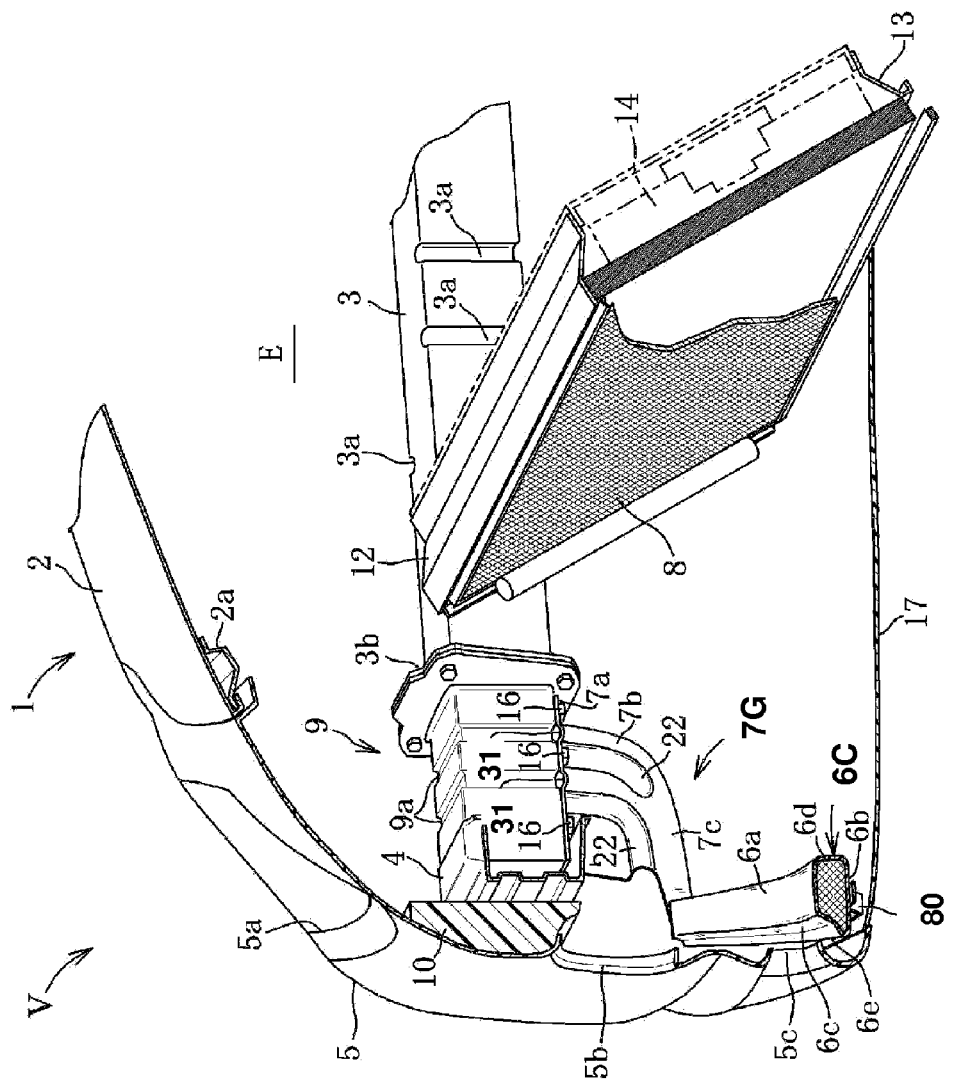
FIG. 26 is a perspective view of a major part of a right-half inside of a front body, omitting the shroud panel.
Figure 27:
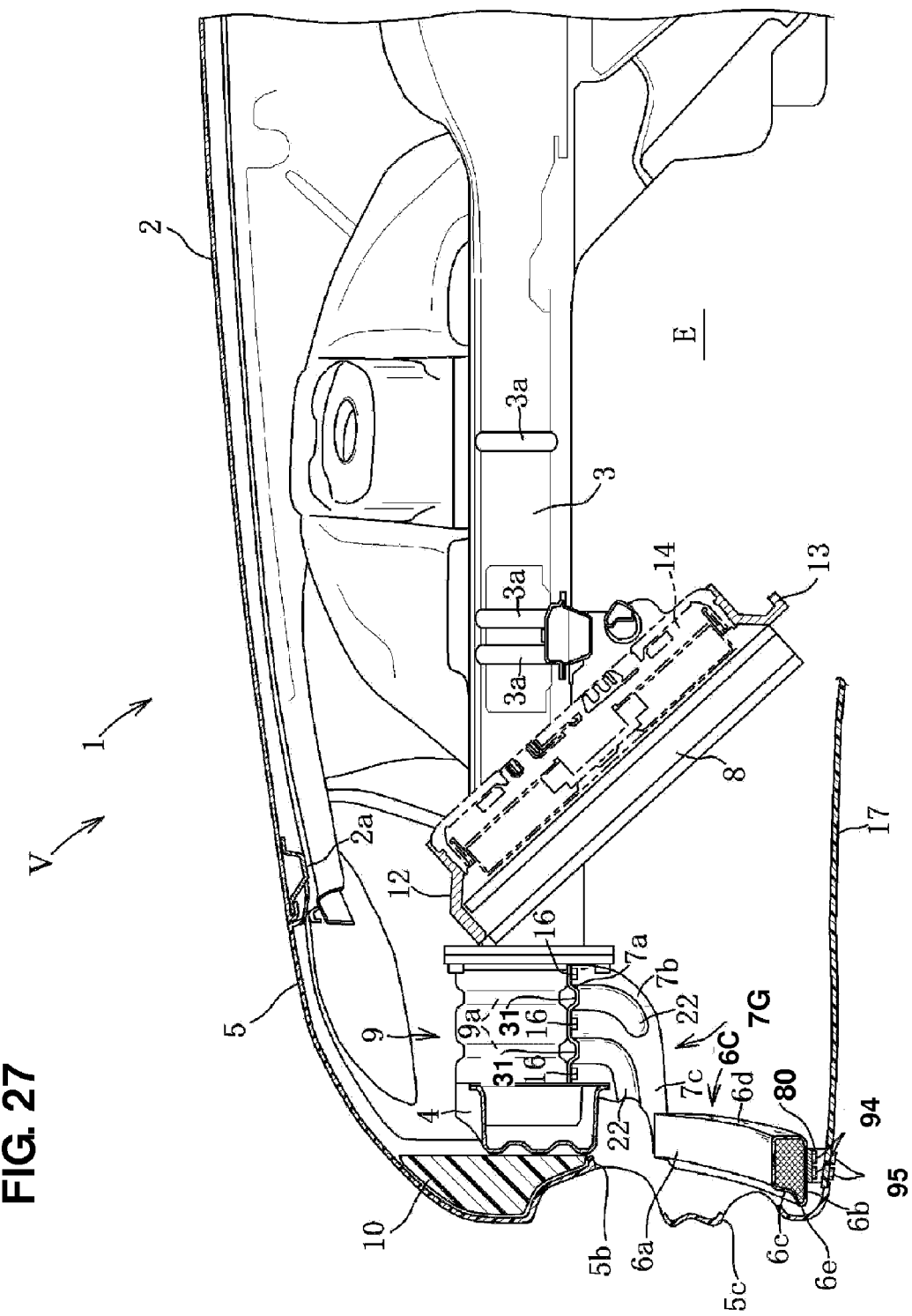
FIG. 27 is a sectional view taken along line IV-IV of FIG. 24.
Figure 28:
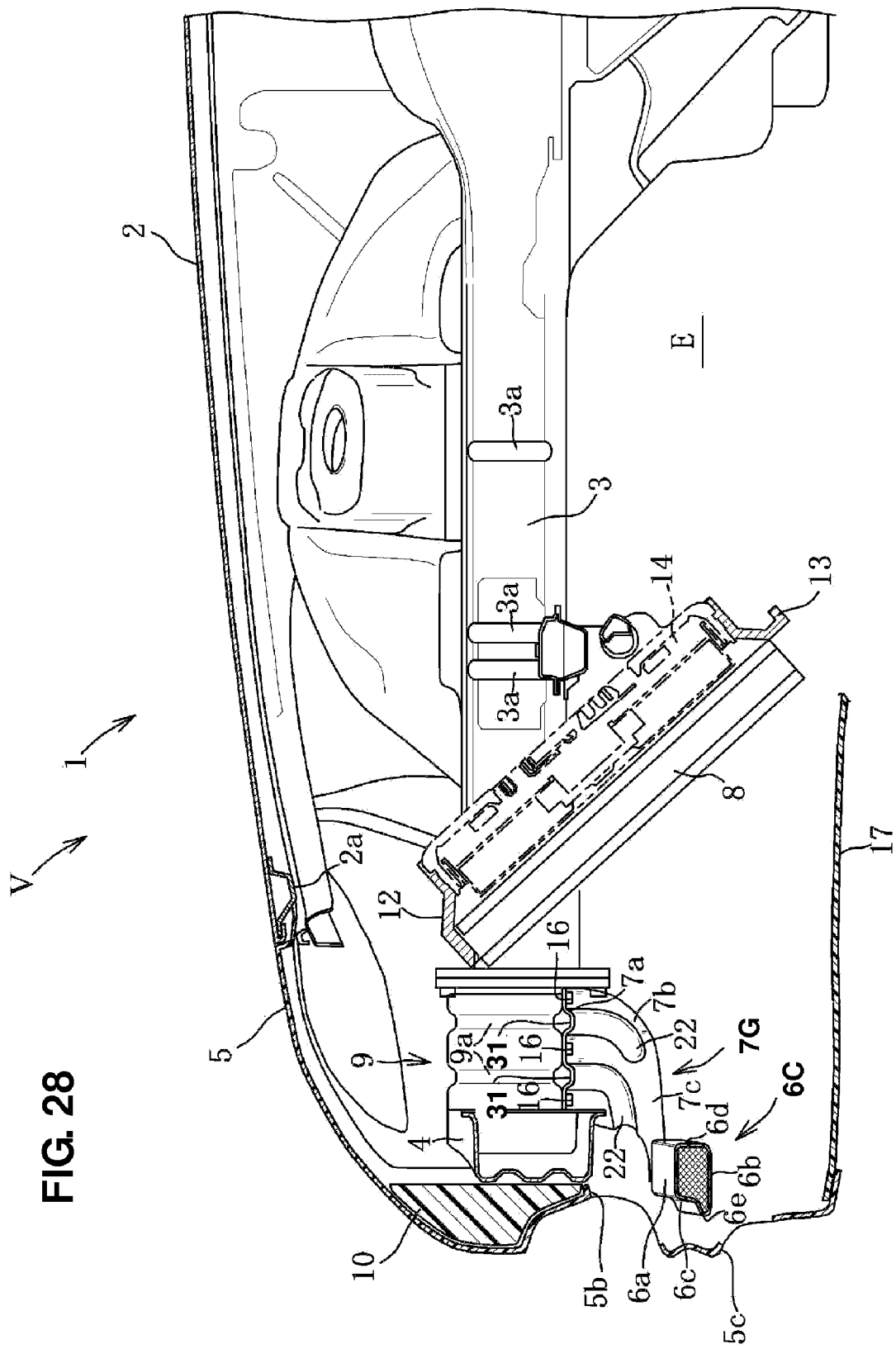
FIG. 28 is a sectional view taken along line V-V of FIG. 24.

In the present embodiment, a leg-part sweeping-away member 6C as the laterally-extending member is formed so that its both-side end portions are positioned above its central portion. In particular, this leg-part sweeping-away member 6C is formed in a curve shape in the elevation view so that its central portion is positioned lowermost and its both-side portions extend upwardly toward its both-side ends as apparently shown in FIG. 25. The both-side ends of the leg-part sweeping-away member 6C are positioned right below the pair of front side frames 3.

Figure 24:
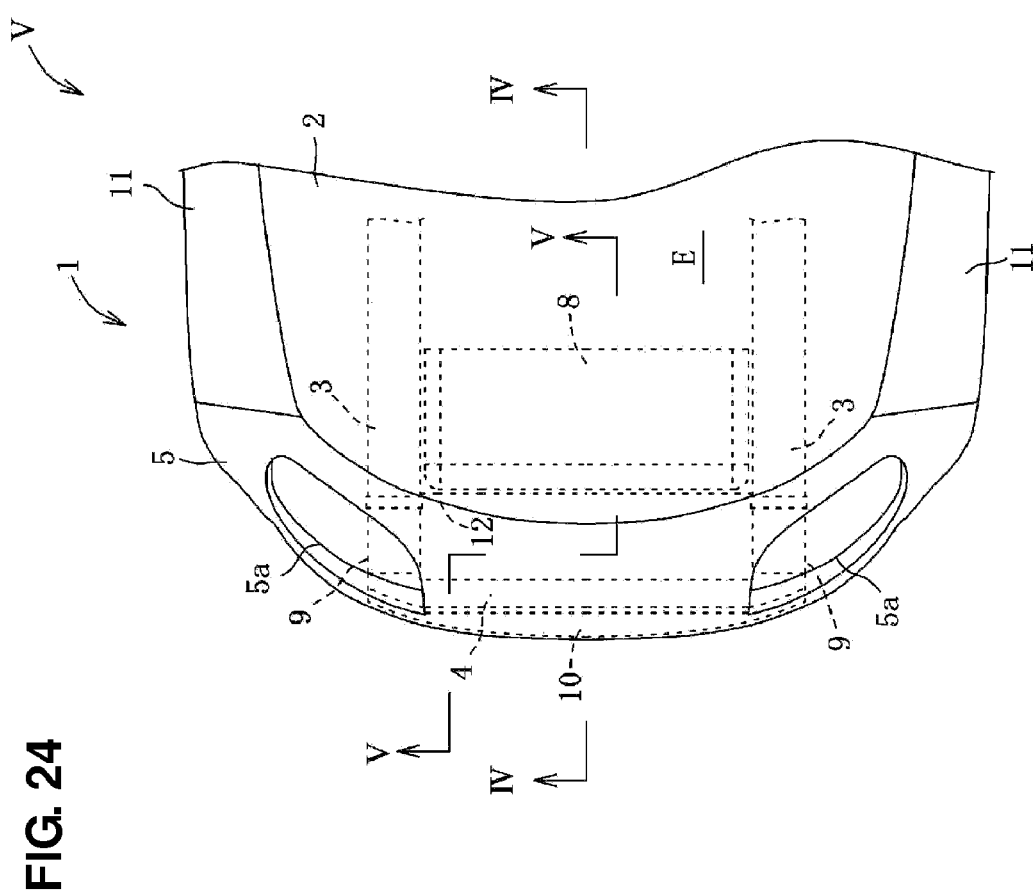
FIG. 24 is a plan view of a front body structure of a vehicle according to a ninth embodiment of the present invention.

Herein, the bumper face 5 is formed in the curve shape in the plan view so that its central portion is positioned foremost and its both-side portions extend rearwardly as shown in FIG. 24, like the first embodiment.

As shown in FIGS. 25 through 29, a steel-plate made support member 7G has a structure which is substantially similar to the support member 7 of the above-described first embodiment. That is, this support member 7G comprises the attachment portion 7a to attach the support member 7G to the crush can 9, the support body portion 7b, the impact transmission portion 7c which transmits the impact load to the support body portion 7b and attaches the leg-part sweeping-away member 6C, and so on.

Figure 29:
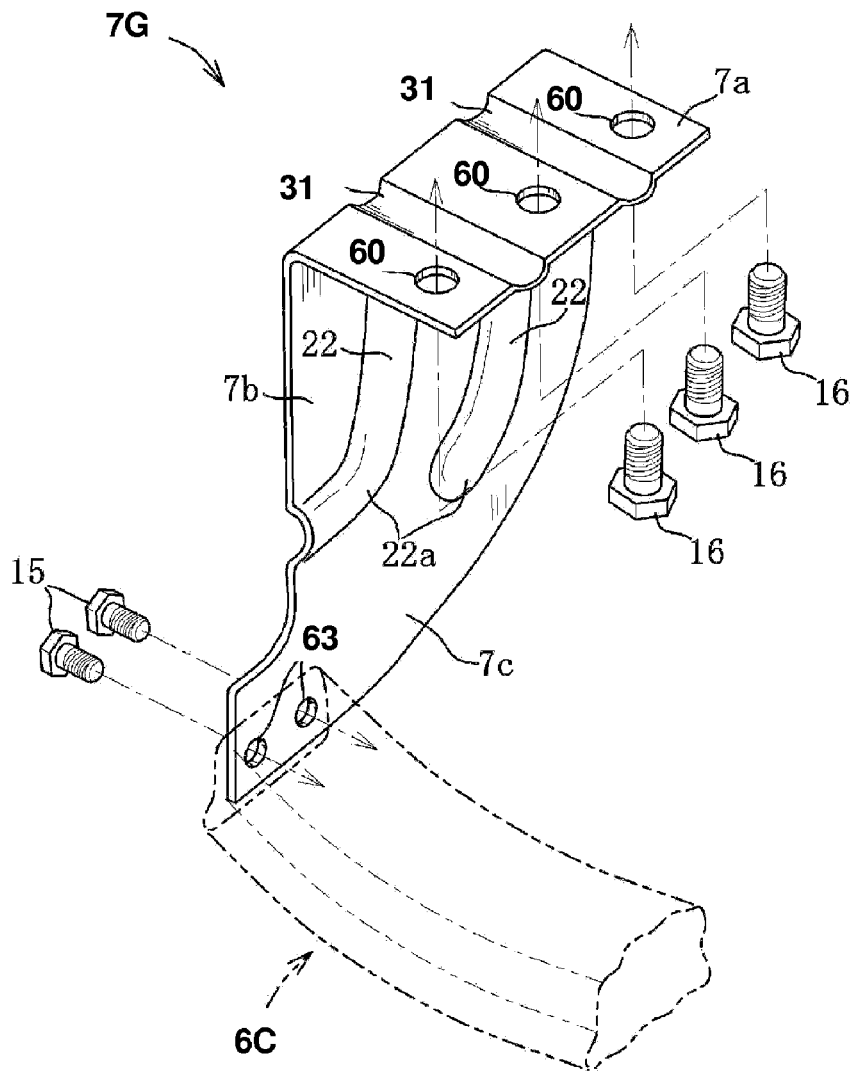
FIG. 29 is a perspective view of a support member.

In the present embodiment, the attachment portion 7a includes, as shown in FIG. 29, three bolt holes 60 which are formed at a front portion, a middle portion, and a rear portion for the blots 16, respectively, the two-row beads 31, and so on. The support body portion 7b is formed so as to bend from the outside end portion of the attachment portion 7a and extend downwardly, and includes two-row beads 22 (impact absorption portion) which are formed so as to be concaved toward the inside of the vehicle and extend vertically and so on. The impact transmission portion 7c has a pair of bolt holes 63. The leg-part sweeping-away member 6C is fixed to the support member 7G by the bolts 15 which are inserted into these bolt holes 63. Thus, the both-side ends of the leg-part sweeping-away member 6C are provided right below the outside ends of the crush cans 9.

Figure 30:
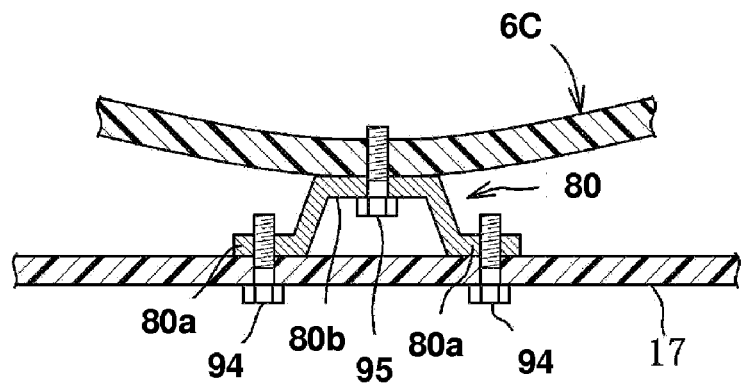
FIG. 30 is a view showing a connection structure of the support member and an undercover.

In the present embodiment, as shown in FIG. 30, at a front end of the undercover 17 is arranged a support bracket 80 to support the central portion of the leg-part sweeping-away member 6C at the vehicle central position. This metal-made support bracket 80 has a cross section which is of a U shape. The support bracket 80 comprises a pair of connection portions 80a which is connected to the undercover 17, a connection portion 80b which is positioned between these portions 80a and connected to the central portion of the leg-part sweeping-away member 6C, and so on. The support bracket 80 is fixed to the upper face of the undercover 17 by four bolts 94 via the connection portion 80a, and the leg-part sweeping-away member 6C is supported at the undercover 17 by bolts 95 via the connection portion 80b. Thus, since the central portion of the leg-part sweeping-away member 6C is supported firmly at the undercover 17, any move of the central portion of the leg-part sweeping-away member 6C which may be caused by a downward bending moment at vehicle collision with the pedestrian can be properly restrained. Thus, the leg part of the pedestrian can be securely swept away at a previously-set height position, so that pedestrian can be properly put on the engine hood 2.

According to the present embodiment, since the leg-part sweeping-away member 6C is formed in the curve shape in the elevation view so that its both-side end portions are positioned above its central portion, even in case the leg-part sweeping-away member 6C is located at a low height position, a space can be formed at the lower portion at the both sides. Thus, the bumper face 5 can be formed in the curve shape so that lower portions of both-side ends of the bumper face 5 are positioned rearwardly from its central portion, so that the design flexibility of the vehicle front portion can be increased.

Further, since the both-side ends of the leg-part sweeping-away member 6C are positioned right below the pair of front side frames 3, the sweeping-away function of the pedestrian's leg part can be performed in a wide range in the vehicle width direction between the pair of front side frames 3, so that the safety of the pedestrian at the collision with the vehicle can be secured.

Moreover, since the leg-part sweeping-away member 6C is formed in the curve shape in the elevation view so that its central portion is positioned lowermost and its both-side portions extend upwardly toward its both-side ends, the leg-part sweeping-away member 6C can be properly short, so that the vehicle can be properly light. Further, when the leg part of the pedestrian contacts the leg-part sweeping-away member 6C, the pedestrian can be properly guided onto the center of the engine hood 2. Accordingly, it can be effectively prevented that the pedestrian hits against the bumper reinforcement 4 directly at the outside portion of the front portion of the vehicle.

Additionally, since the front body structure of a vehicle further comprises the undercover 17 which is positioned below the leg-part sweeping-away member 6C and covers the lower face of the vehicle, wherein the undercover 17 has the support bracket 80 to support the leg-part sweeping-away member 6C at the front end of its central portion, the downward moment which acts on the central portion of the leg-part sweeping-away member 6C at the vehicle collision with the pedestrian can be supported by the undercover 17, so that the move of the leg-part sweeping-away member 6C can be restrained. Accordingly, the sweeping away of the leg part of the pedestrian can be conducted at the effective height position.

Embodiment 10

Figure 31:
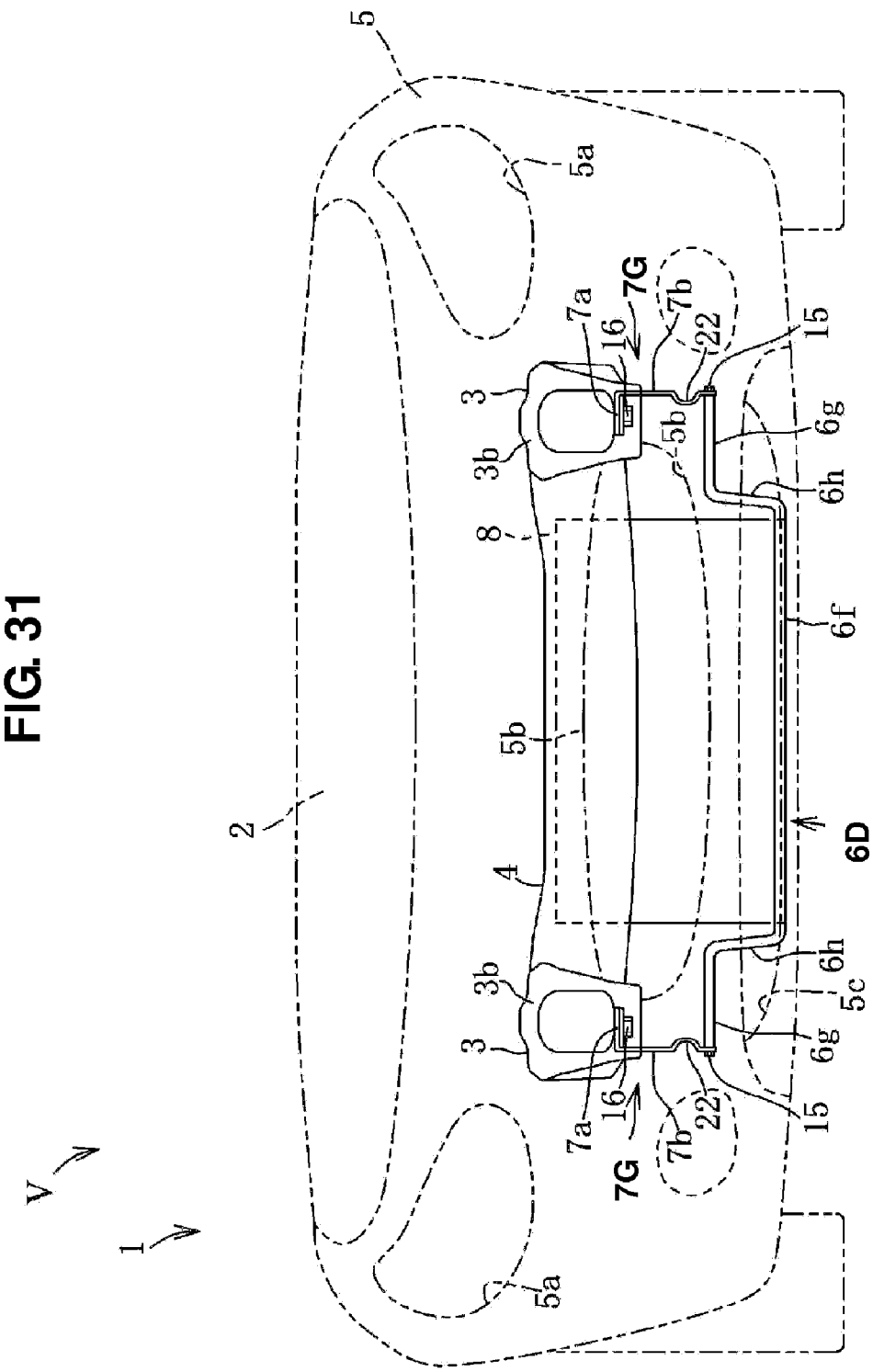
FIG. 31 is an elevation view of the vehicle, which corresponds to FIG. 25, according to a tenth embodiment.
Figure 32:
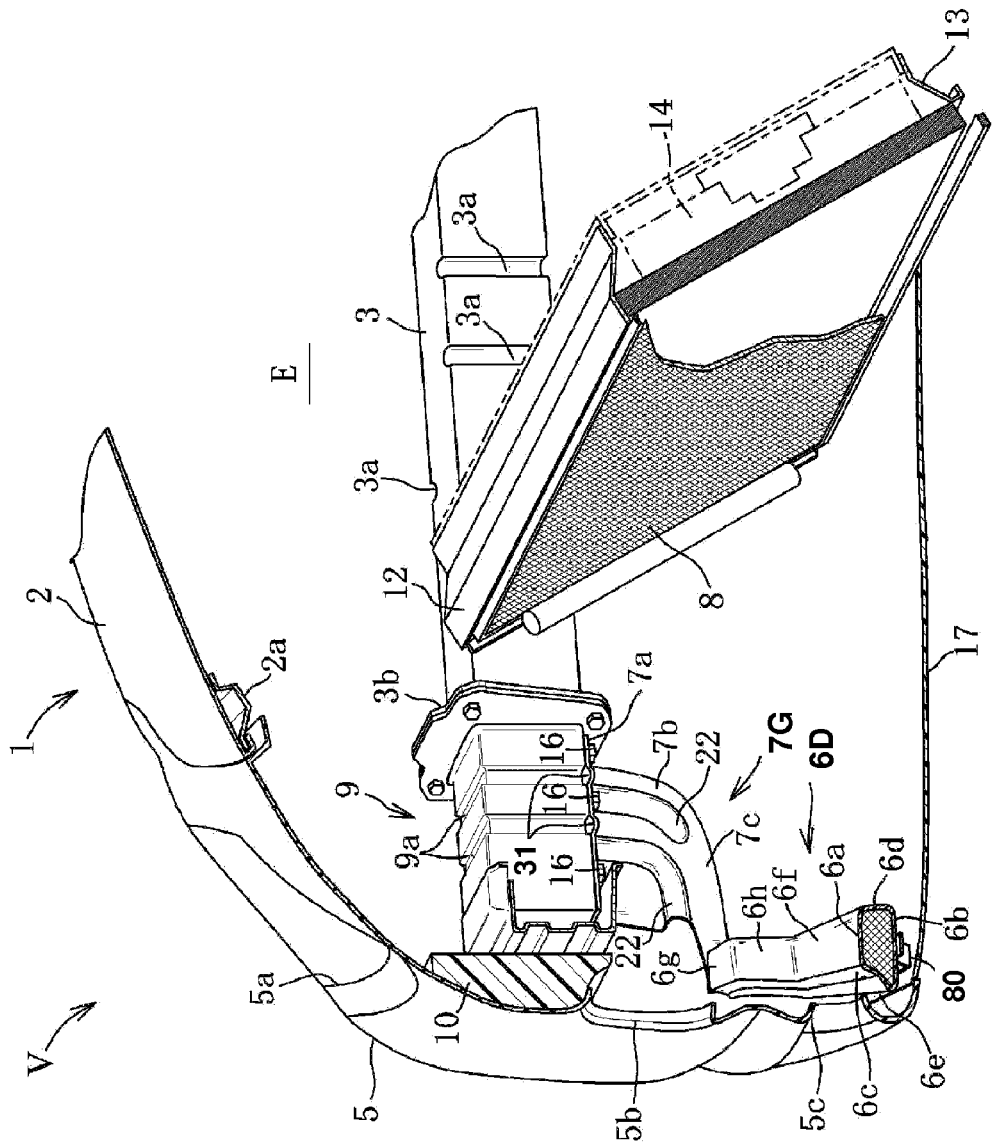
FIG. 32 is a perspective view of the vehicle, which corresponds to FIG. 26, according to the tenth embodiment.

A front body structure of a vehicle according to a tenth embodiment will be described referring to FIGS. 31 and 32. Herein, only different structure from the above-described ninth embodiment will be described, and the same components as the ninth embodiment are denoted by the same reference characters, descriptions of which are omitted here.

A leg-part sweeping-away member 6D (laterally-extending member) is provided in front of and below the bumper reinforcement 4, that is, below the impact absorbing member 10 and behind the traveling-air induction opening 5c which corresponds to the height of a pedestrian's leg part so that its front end is positioned forwardly from the bumper reinforcement 4. The leg-part sweeping-away member 6D, which is made from synthetic resin, is formed in a U shape in the elevation view so that its central portion is concaved downwardly.

The leg-part sweeping-away member 6D is comprised of a central portion 6f, outside end portions 6g which form both end portions thereof, standing-up portions 6h which are formed between the central portion 6f and the outside end portions 6g, and so on. The leg-part sweeping-away member 6D comprises, like the ninth embodiment, the upper face portion 6a, lower face portion 6b, front face portion 6c, rear face portion 6d, and so on, and has a solid structure which extends in the vehicle width direction.

The above-described central portion 6f extends substantially straightly over the width of the radiator 8 in the elevation view. The height position of the central portion 6f corresponds to a lower edge of the traveling-air induction opening 5c. The outside end portions 6g are formed so as to extend substantially straightly from the both-side ends of the leg-part sweeping-away member 6D toward the central portion at a height position between the traveling-air induction openings 5b and 5c.

The both standing-up portions 6h extend upwardly at a transition portion from the both ends of the central portion 6f to the respective outside end portions 6g, upper ends of which are positioned below a lower edge of the traveling-air induction opening 5b. Thus, a space can be formed on the outside of the standing-up portions 6h. Thereby, the space where the bumper face 5 can curve is formed on the outside of the standing-up portions 6h, so that the lower portion of the bumper face can be formed in the curve shape in the plan view so that its both-side portions are located rearwardly compared to its central portion. Accordingly, the design flexibility can be increased.

Embodiment 11

A modification of the crush can which is integrally formed with the support member supporting the leg-part sweeping-away member will be described referring to FIG. 33. Herein, only different structure from the crush can 9 of the previous embodiments will be described, and the same components as the first embodiment are denoted by the same reference characters, descriptions of which are omitted here. The both-side crush cans have the same structure, so the right-side crush can will be described.

Figure 33:
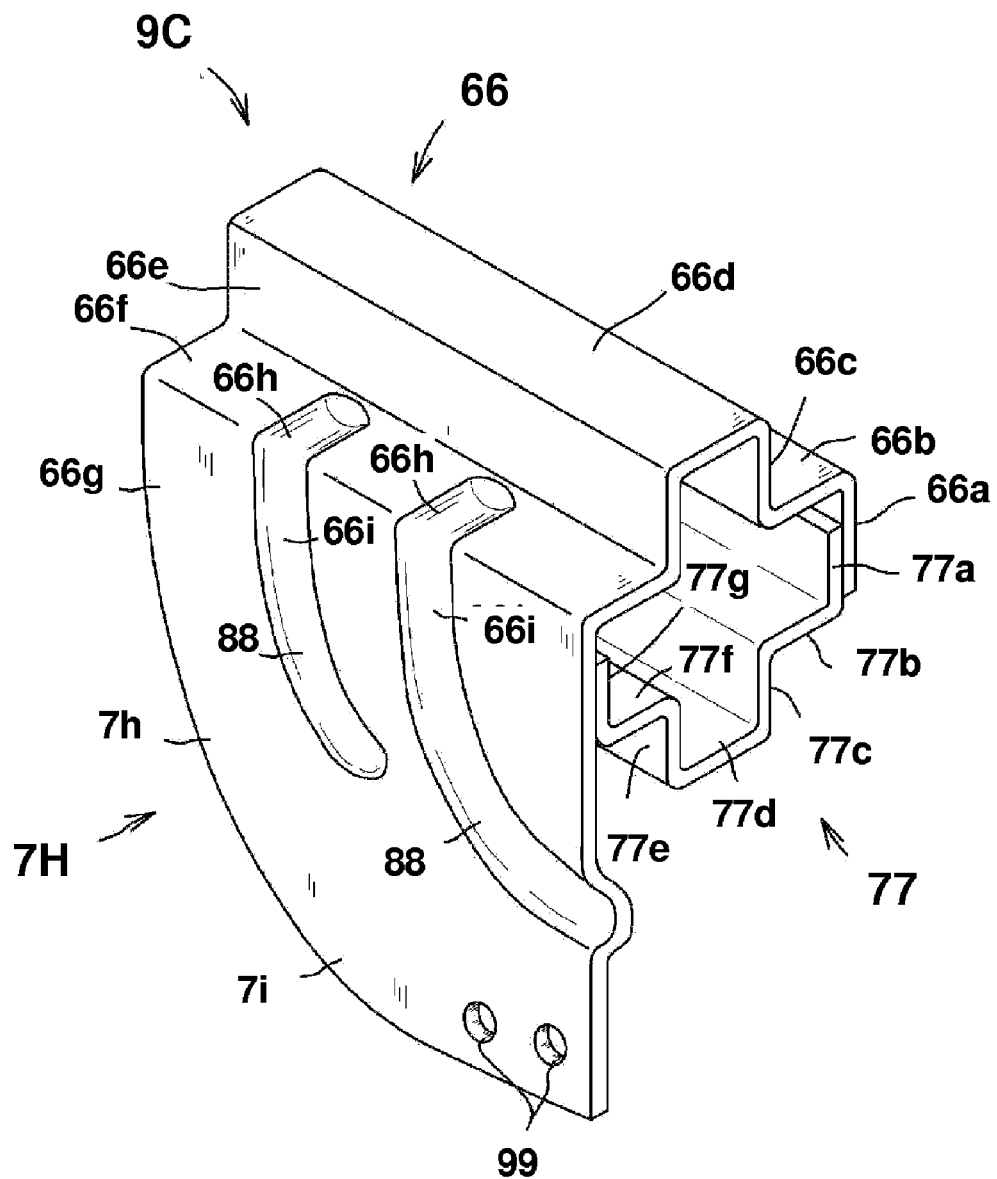
FIG. 33 is a perspective view of a modification of a crush can which is integrally formed with the support member according to an eleventh embodiment.

As shown in FIG. 33, a crush can 9C of the present embodiment comprises an upper panel 66 and a lower panel 77, which form together a cross-shaped closed cross section which extends in the vehicle longitudinal direction. The upper panel 66 comprises a vertical face portion 66a located on the vehicle inside, a horizontal face portion 66b which connects an upper end portion of the vertical face portion 66a and a lower end portion of a vertical face portion 66c, the vertical face portion 66c which connects an outside end portion of the horizontal face portion 66b and an inside end portion of a horizontal face portion 66d, the horizontal face portion 66d which connects an upper end portion of the vertical face portion 66c and an upper end portion of a vertical face portion 66e, the vertical face portion 66e which connects an outside end portion of the horizontal face portion 66d and an inside end portion of a horizontal face portion 66f, the horizontal face portion 66f which connects a lower end portion of the vertical face portion 66e and an upper end portion of a vertical face portion 66g, the vertical face portion 66g which extends downwardly from an upper end portion of the horizontal face portion 66f, and so on.

Two-row beads 66h are formed on the horizontal face portion 66f so as to extend perpendicularly to the vehicle longitudinal direction and be concaved toward the inside of the crush can 9C. On the vertical face portion 66g are formed two-row beads 66i which are continuous from the above-described beads 66h and concaved inwardly and extend downwardly, respectively.

The lower panel 77 comprises a vertical face portion 77a located on the vehicle inside, a horizontal face portion 77b which connects a lower end portion of the vertical face portion 77a and an upper end portion of a vertical face portion 77c, the vertical face portion 77c which connects an outside end portion of the horizontal face portion 77b and an inside end portion of a horizontal face portion 77d, the horizontal face portion 77d which connects a lower end portion of the vertical face portion 77c and a lower end portion of a vertical face portion 77e, the vertical face portion 77e which connects an outside end portion of the horizontal face portion 77d and an inside end portion of a horizontal face portion 77f, the horizontal face portion 77f which connects an upper end portion of the vertical face portion 77e and a lower end portion of a vertical face portion 77g, the vertical face portion 77g which extends downwardly from an upper end portion of the horizontal face portion 77f, and so on. The closed cross section of the crush can 9C which extends in the vehicle longitudinal direction is formed by welding the vertical face portion 66a to the vertical face portion 77a and welding the vertical face portion 66g to the vertical face portion 77g.

The support member 711 extends downwardly from a lower end of the vertical face portion 66g so as to be informed integrally with the crush can 9C. The support member 711 comprises a support body portion 7h and an impact transmission portion 7i. Two-row beads 88 (impact absorption portion) which are concaved inwardly and extend vertically are formed at the support body portion 7h.

The front bead 88 extends downwardly continuously from a lower end of the front bead 66i, and curves forwardly at a lower portion of the support body portion 7h and extends up to a front end portion of the support body portion 7h. The rear bead 88 extends downwardly continuously from a lower end portion of the rear bead 66i, and curves forwardly at a lower portion of the support body portion 7h. A bead depth and a vertical length of each bead 88 are set so as to absorb the impact load which is greater than the collision energy necessary to put the pedestrian on the engine hood 2 when the vehicle collides with the pedestrian.

The impact transmission portion 7i is formed so as to curve forwardly from a lower end portion of the support body portion 7h and has a pair of bolt holes 99. The leg-part sweeping-away member 6 which is arranged on the inside of the support body portion 7h is fixed to the support member 711 by bolts (not illustrated) inserted through the bolt holes 99.

As described above, since the vertical face portion 66g of the crush can 9C extends downwardly and is formed integrally with the support member 711 to support the leg-part sweeping-away member 6, it may be unnecessary to provide any particular attachment portion for the support member 711, so that the reduction of the vehicle weight and the easy control of crush deformation of the crush can 9C can be achieved.

Figure 34:
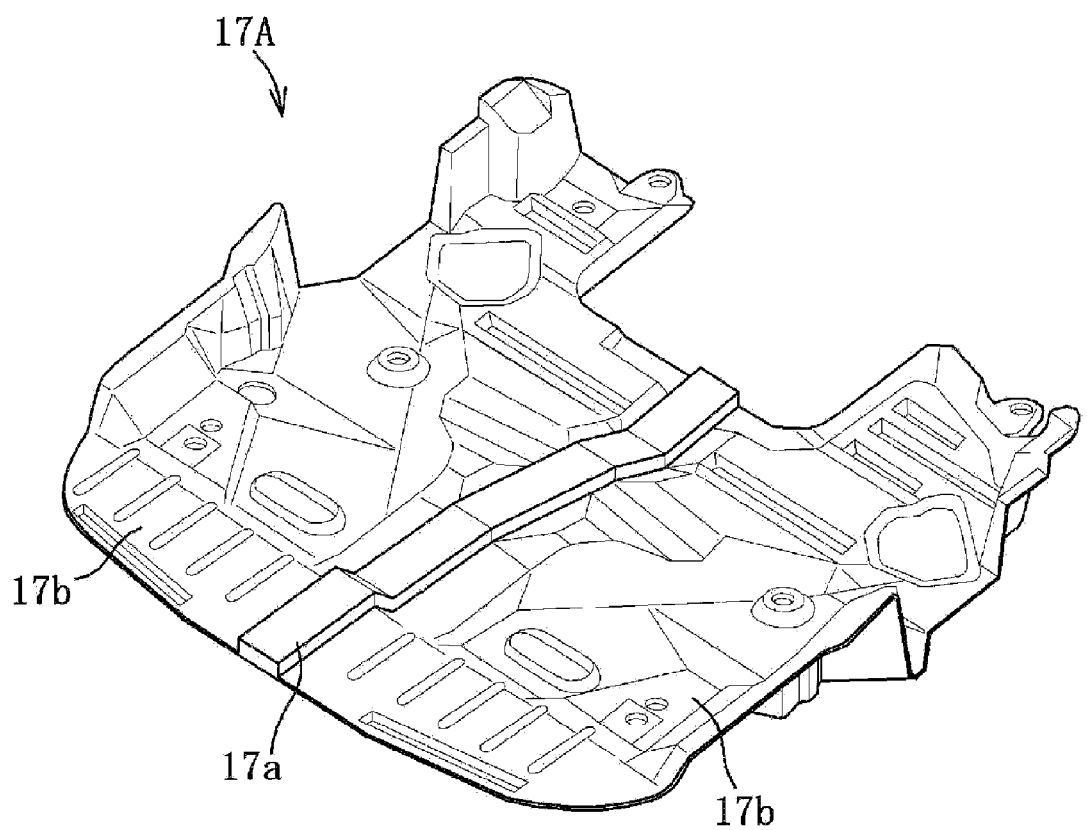
FIG. 34 is a perspective view of a modification of an undercover.

A modification of the undercover will be described referring to FIG. 34. Herein, only different structure from the undercover 17 of the previous embodiment will be described, and the same components as the first embodiment are denoted by the same reference characters, descriptions of which are omitted here. An undercover 17A is formed in a substantially rectangular shape in the plan view having an inlet-shaped portion at its rear portion. The undercover 17A, which is made from synthetic resin, comprises a central portion 17a which extends in the vehicle longitudinal direction from a front end portion to a rear end portion at its center, a pair of side portions 17b which is integrally formed with the central portion 17a, and so on. The central portion 17a is made from fiber reinforced plastic (FRP) with synthetic-resin glass fibers mixed. The width of the central portion 17a is set so that the support bracket 80 to support the central portion of the leg-part sweeping-away member 6 can be fixed with the bolt 94.

As described above, the longitudinal-direction support rigidity of the central portion 17a to fix the support bracket 80 can be increased. Thereby, the downward moment which acts on the central portion of the leg-part sweeping-away member 6 at the vehicle collision with the pedestrian can be supported properly, so that the move of the leg-part sweeping-away member 6 which may be caused by the vehicle collision can be suppressed securely.

The present invention should not be limited to the above-descried embodiments, and any other modifications or improvements may be applied within the scope of a sprit of the present invention.

For example, while the above-described embodiment shows an example in which the support member is made of the steel plate, it will be fine as long as the support member can absorb the impact load greater than the necessary impact energy for putting the pedestrian on the engine hood at the vehicle collision. Thus, the support member may be made of any other material, such as resin, and thereby the same effects may be performed.

Further, while the above-described embodiment shows an example in which the impact transmission portion transmits the longitudinal-direction impact load to support body portion without damping, it will be fine as long as the impact load can be absorbed by the support member. Thus, any impact absorption portion, such as beads, which can absorb the longitudinal-direction impact load may be provided at the impact transmission portion.

Moreover, while the above-described embodiment shows an example in which the beads as the impact absorption portion and the beads as the weak portion are formed continuously, these beads may be formed separately. Also, the impact absorption and the weak portion may be constituted by an opening which is formed at the support member.

While the above-described embodiment shows an example in which the traveling-air guide portion is fixed to the projection portion of the support member, the projection portion may be configured to slant inwardly so that the projection portion can perform the function of the traveling-air guide portion.

While the above-described embodiment shows an example in which the intercooler as the second heat exchanger is arranged at one side of the leg-part sweeping-away member, it will be fine as long as it conducts a heat exchange with the traveling air. Thus, an oil cooler or others may be provided instead. Also, these coolers may be arranged at the both ends of the leg-part sweeping-away member.

Additionally, while the above-described embodiment shows an example in which the leg-part sweeping-away member is made of synthetic resin, it will be fine as long as the leg-part sweeping-away member can sweep away the pedestrian's leg part absorb so that the pedestrian can be put on the engine hood. Thus, the leg-part sweeping-away member may be made of metal, such as the steel plate. Also, the leg-part sweeping-away member may be comprised of some parts which are made of different materials from each other.

Further, while the above-described embodiment shows an example in which the both-side standing-up portions extend upwardly at the transition portion from the both ends of the central portion to the outside end portions of the leg-part sweeping-away member, they may be formed so as to slant or curve upwardly.

Moreover, while the above-described embodiment shows an example in which the pair of crush cans are arranged at the front end of the front side frames and the grooves are formed at the crush cans, no crush can may be provided and these beads may be formed at the front end portions of the front side frames thereof. In this case, the both support members are supported at these front end portions of the front side frames so that the beads formed at the support members are positioned so as to correspond to the grooves formed at the front end portions of the front side frames.

What is claimed is:

1. A front body structure of a vehicle, comprising:
   a pair of front side frames extending in a vehicle longitudinal direction below an engine hood;
   a bumper reinforcement attached to respective front end portions of the front side frames and extending in a vehicle width direction;
   a bumper face forming an outer surface of a front end portion of the vehicle;
   a laterally-extending member provided below the bumper reinforcement and extending in the vehicle width direction, a front end of which is positioned in front of the bumper reinforcement; and
   a support member supporting the laterally-extending member at the front side frame, the support member having a specified length in the vehicle longitudinal direction, the support member comprising an impact absorption portion which absorbs an impact load inputted in the vehicle longitudinal direction at least through deformation thereof in the longitudinal direction;
   wherein said front side frame comprises a groove which is formed so as to extend vertically at a specified portion thereof which overlaps with said support member in the vehicle longitudinal direction, and said impact absorption portion of the support member comprises a bead which is formed so as to extend vertically at a specified portion thereof which overlaps with said groove of the front side frame in the vehicle longitudinal direction.

2. The front body structure of a vehicle of claim 1, further comprising a heat exchanger provided between said pair of front side frames in back of said support member, wherein said bumper face has a traveling-air induction opening which is formed at a central area thereof in the vehicle width direction to induct traveling air into the vehicle, and said support member has a traveling-air guide portion to guide the traveling air inducted through the traveling-air induction opening to said heat exchanger.

3. The front body structure of a vehicle of claim 2, wherein said support member is attached to the front side frame so that the traveling air which is inducted through said traveling-air induction opening and flows below the front side frame is guided to the heat exchanger by said traveling-air guide portion thereof.

* * * * *